United States Patent
Penna et al.

(10) Patent No.: US 10,044,423 B2
(45) Date of Patent: Aug. 7, 2018

(54) SYSTEM AND METHOD FOR PRECODER SELECTION IN MULTIPLE-INPUT MULTIPLE-OUTPUT (MIMO) SYSTEMS WITH DISCRETE FOURIER TRANSFORM (DFT)-BASED CODEBOOK

(71) Applicant: Samsung Electronics Co., Ltd., Gyeonggi-do (KR)

(72) Inventors: Federico Penna, San Diego, CA (US); Hongbing Cheng, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/453,553

(22) Filed: Mar. 8, 2017

(65) Prior Publication Data
US 2018/0115351 A1    Apr. 26, 2018

Related U.S. Application Data

(60) Provisional application No. 62/410,744, filed on Oct. 20, 2016.

(51) Int. Cl.
*H04B 7/02* (2018.01)
*H04B 7/0456* (2017.01)
*H04L 25/03* (2006.01)

(52) U.S. Cl.
CPC ..... *H04B 7/0456* (2013.01); *H04L 25/03949* (2013.01)

(58) Field of Classification Search
CPC .......... H04L 25/03159; H04L 27/2636; H04L 25/03949; H04L 27/265; H04B 7/0456; H04B 7/0478; H04B 7/0857
See application file for complete search history.

(56) References Cited

U.S. PATENT DOCUMENTS

| | | |
|---|---|---|
| 7,751,494 B2 | 7/2010 | Borkar et al. |
| 7,769,098 B2 | 8/2010 | Borkar et al. |

(Continued)

FOREIGN PATENT DOCUMENTS

| | | |
|---|---|---|
| WO | WO 2015174616 | 11/2015 |
| WO | WO 2016120443 | 8/2016 |

OTHER PUBLICATIONS

Yang, Fengrui et al., Precoding Matrix Index Estimation Algorithm in LTE-A System, Multimedia Information Networking and Security (MINES), 2012 Fourth International Conference on Multimedia Information Networking and Security, pp. 164-167.

(Continued)

*Primary Examiner* — Rahel Guarino
(74) *Attorney, Agent, or Firm* — The Farrell Law Firm, P.C.

(57) ABSTRACT

An apparatus and a method. The apparatus includes a singular value decomposition (SVD) processor configured to receive a channel matrix H and output samples y of an optimal precoding matrix for H; a linear phase estimation (LPE) processor connected to the SVD processor and configured to determine a phase estimate $\hat{\theta}_l$ of an angle $\theta_l$ of a horizontal discrete Fourier transform (DFT) index l, where l is an integer; and a decision processor connected to the LPE processor and configured to determine a hard estimate of l.

20 Claims, 11 Drawing Sheets

(56) References Cited

U.S. PATENT DOCUMENTS

| | | |
|---|---|---|
| 8,160,125 B2 | 4/2012 | Clerckx et al. |
| 8,467,467 B2 | 6/2013 | Lee et al. |
| 8,654,663 B2 | 2/2014 | Prasad et al. |
| 8,842,764 B2 | 9/2014 | Werner et al. |
| 8,848,818 B2 | 9/2014 | Kim et al. |
| 8,873,661 B2 | 10/2014 | Kent et al. |
| 8,934,557 B2 | 1/2015 | Cavalcante et al. |
| 8,938,020 B2 | 1/2015 | Kim et al. |
| 8,976,775 B2 | 3/2015 | Khojastepour et al. |
| 9,042,476 B2 | 5/2015 | Krishnamurthy |
| 9,231,678 B2 | 1/2016 | Tang et al. |
| 9,401,750 B2 | 7/2016 | Sayana et al. |
| 9,432,100 B2 | 8/2016 | Sun et al. |
| 2013/0321207 A1 | 12/2013 | Monogioudis et al. |
| 2014/0314169 A1* | 10/2014 | Pan .................. H04B 7/0417 375/267 |
| 2016/0142117 A1 | 5/2016 | Rahman et al. |
| 2016/0156397 A1 | 6/2016 | Onggosanusi et al. |
| 2016/0226567 A1 | 8/2016 | Jia et al. |

OTHER PUBLICATIONS

Wang, Chuan et al., Precoder Selection Under K-best MIMO Detection for 3GPP-LTE/LTE-A Systems, Communications (APCC), 2012 18th Asia-Pacific Conference on Oct. 15-17, 2012 Copyright 2012 IEEE, pp. 933-938.

\* cited by examiner

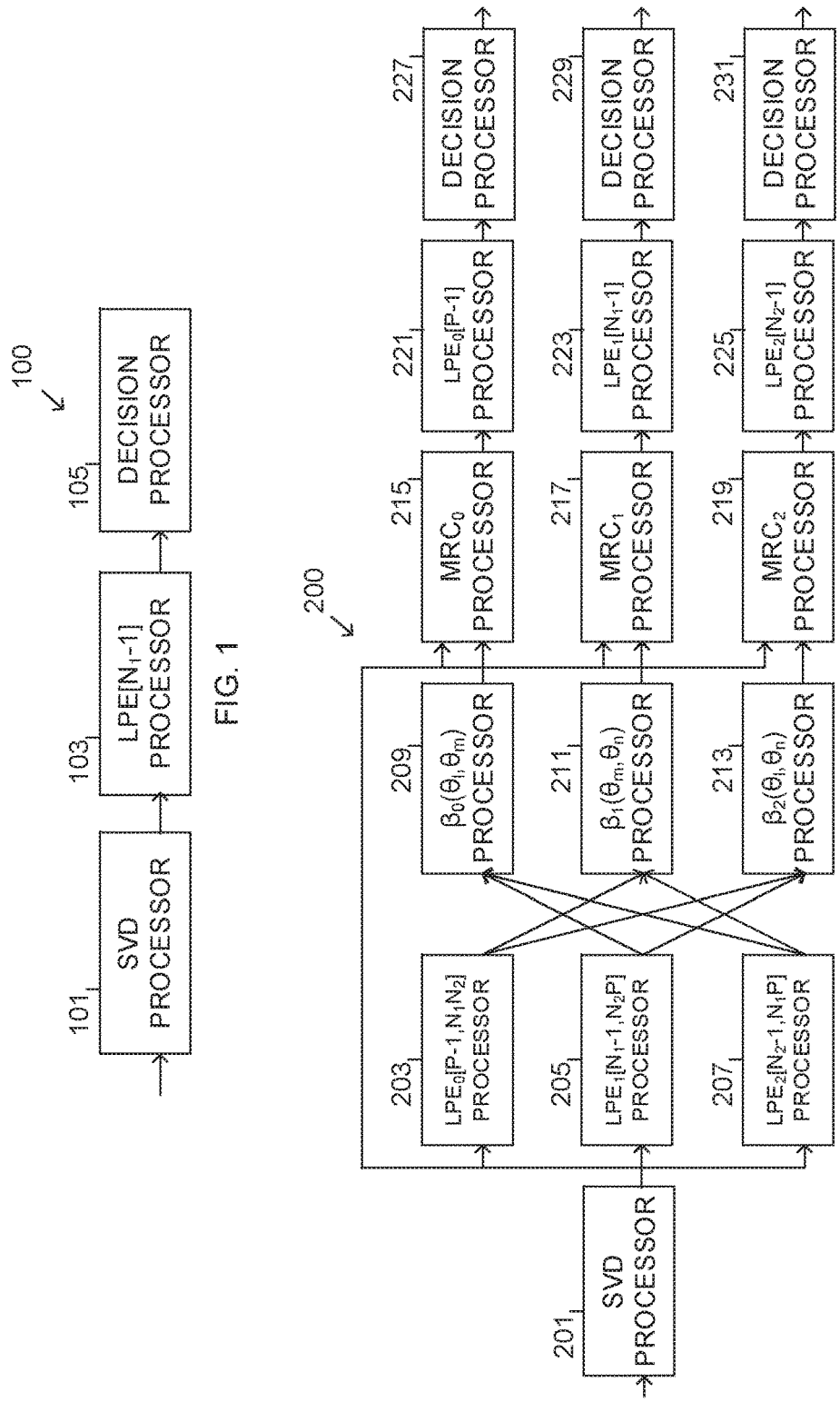

SYSTEM AND METHOD FOR PRECODER SELECTION IN MULTIPLE-INPUT MULTIPLE-OUTPUT (MIMO) SYSTEMS WITH DISCRETE FOURIER TRANSFORM (DFT)-BASED CODEBOOK

PRIORITY

This application claims priority under 35 U.S.C. § 119(e) to a U.S. Provisional Patent Application filed on Oct. 20, 2016 in the United States Patent and Trademark Office and assigned Ser. No. 62/410,744, the entire contents of which are incorporated herein by reference.

FIELD

The present disclosure relates generally to wireless communications systems, and more particularly, to a system and a method for precoder selection in multiple-input multiple-output (MIMO) systems with discrete Fourier transform (DFT)-based codebook.

BACKGROUND

Modern cellular networks (e.g., long term evolution (LTE)) rely on multiple antennas, both at a base station (also referred to as an evolved node B (eNB) and at a mobile terminal (also referred to as a user equipment (UE)), in order to increase network capacity and data rate for users. A communication system with multiple antennas at a transmitter side and a receiver side is referred to as a MIMO system.

There has been a steady increase in the number of antennas in a MIMO system, especially at the eNB side, in an effort to achieve higher spatial multiplexing and diversity gains (which result in more data streams transmitted simultaneously and higher signal-to-noise ratios (SNRs) for the served users), as well as better coverage by forming narrow beams or virtual sectors in a cell. For example, the latest release of LTE (Release 13), in 2015, introduced the feature of "full dimension (FD)/elevation beamforming (EB) MIMO," whereby the eNB supports two dimensional (vertical and horizontal) antenna arrays with 8 transceiver units, which translates to 16 antenna ports (taking into account the polarization dimension) from the UE point of view.

The trend towards higher-dimensional MIMO systems is expected to continue with the next generation of cellular networks (e.g. 5G), which will likely support even larger antenna arrays. The performance of a MIMO communication system strongly depends on the selection of an appropriate precoding matrix to adapt a transmitted signal to a wireless channel. As a wireless channel is time-varying, it is essential to update a precoding matrix often enough to follow the channel variations. However, this requires feedback of channel state information (CSI) from a UE to an eNB. Hence, a trade-off must be determined between the conflicting requirements of frequent feedback (for better CSI accuracy) and limited feedback (so as to leave more bandwidth for data transmission). Practical systems such as LTE address this issue by specifying a pre-defined set of precoding matrices (also referred to as a codebook), known to both an eNB and a UE, so that the UE may select a certain matrix (also referred to as a codeword) from the codebook by indicating its index. Such an index may be referred to as a precoding matrix indicator (PMI).

As the number of antennas and beamforming dimensions increase, the codebook size also increases. Therefore, it becomes increasingly challenging for the UE to efficiently search for the best PMI. Other approaches rely on codebook search and compute, for each PMI, the achievable capacity, or mean mutual information per bit (MMIB), or some distance functions.

SUMMARY

According to one embodiment, an apparatus includes a singular value decomposition (SVD) processor configured to receive a channel matrix H and output samples y of an optimal precoding matrix for H; a linear phase estimation (LPE) processor connected to the SVD processor and configured to determine a phase estimate $\hat{\theta}_l$ of an angle $\theta_l$ of a horizontal DFT index l, where l is an integer; and a decision processor connected to the LPE processor and configured to determine a hard estimate of l.

According to one embodiment, an apparatus includes a singular value decomposition (SVD) processor configured to receive a channel matrix H and output samples y of an optimal precoding matrix for H; a first plurality of linear phase estimation (LPE) processors connected to the SVD processor and configured to determine phase estimates $\hat{\theta}_l$, $\hat{\theta}_m$, and to $\hat{\theta}_n$ of an angle $\theta_l$ of a horizontal discrete Fourier transform (DFT) index l, an angle $\theta_m$ of a vertical discrete DFT index m, and a co-phasing $\theta_n$ of cross-polarized antennas of a co-phasing index n, respectively, where l, m, and n are integers; a plurality of angle vector processors connected to the first plurality of LPE processors, respectively, and configured to determine angle vectors $\hat{\beta}_0$, $\hat{\beta}_1$, $\hat{\beta}_2$ computed from the phase estimates $\hat{\theta}_l$, $\hat{\theta}_m$, $\hat{\theta}_n$; a plurality of maximal ratio combining (MRC) processors connected to the SVD processor and to the plurality of angle vector processors, respectively, and configured to generate combined vectors $\bar{y}_0$, $\bar{y}_1$, and $\bar{y}_2$, respectively; a second plurality of LPE processors connected to the plurality MRC processors, respectively, and configured to re-estimate $\hat{\theta}_l$, $\hat{\theta}_m$, and $\hat{\theta}_n$, respectively; and a plurality of decision processors connected to the second plurality of LPE processors, respectively, and each configured to determine a hard estimate of l, m, and n, respectively.

According to one embodiment, a method includes computing, by an SVD processor, samples y of an optimal precoding matrix for a channel matrix H, and partitioning them into subvectors for each of variables at l, m, and n; computing, by a first plurality of LPE processors, initial estimates $\hat{\theta}_l$, $\hat{\theta}_m$, $\hat{\theta}_n$ of angles $\theta_l$, $\theta_m$, $\theta_n$; computing, by a plurality of angle vector processors, angle vectors $\hat{\beta}_0$, $\hat{\beta}_1$, $\hat{\beta}_2$ from the initial estimates of $\hat{\theta}_l$, $\hat{\theta}_m$, $\hat{\theta}_n$; applying MRC, by a plurality of MRC processors, to the angle vectors $\hat{\beta}_0$, $\hat{\beta}_1$, $\hat{\beta}_2$ to obtain combined vectors $\bar{y}_0$, $\bar{y}_1$, $\bar{y}_2$; re-estimating $\hat{\theta}_l$, $\hat{\theta}_m$, and $\hat{\theta}_n$ by a second plurality of LPE processors; if the re-estimates $\hat{\theta}_l$, $\hat{\theta}_m$, and $\hat{\theta}_n$ converge or a predetermined number of iterations occur, proceeding to a next step, otherwise, returning to computing, by a plurality of angle vector processors, angle vectors $\hat{\beta}_0$, $\hat{\beta}_1$, $\hat{\beta}_2$ from the initial estimates of $\hat{\theta}_l$, $\hat{\theta}_n$, $\hat{\theta}_n$; and converting, by a plurality of decision processors, the re-estimates $\hat{\theta}_l$, $\hat{\theta}_m$, and $\hat{\theta}_n$ into hard estimates $\hat{l}$, $\hat{m}$, and $\hat{n}$.

According to one embodiment, an apparatus includes an SVD processor configured to receive a channel matrix H and output samples y of an optimal precoding matrix for H; a first plurality of LPE processors connected to the SVD processor and configured to determine phase estimates $\hat{\theta}_l$ and $\hat{\theta}_n$ of an angle $\theta_l$ of a horizontal DFT index l and a co-phasing $\theta_n$ of cross-polarized antennas of a co-phasing index n, respectively, where l and n are integers; a plurality of angle vector processors connected to the first plurality of LPE processors and one of a second plurality of LPE processors, respectively, and configured to determine angle vectors $\hat{\beta}_0$, $\hat{\beta}_1$, $\hat{\beta}_2$ computed from the phase estimates $\hat{\theta}_l$ and $\hat{\theta}_n$, and an MRC based estimate of $\hat{\theta}_m$; a plurality of MRC processors connected to the SVD processor and to the plurality of angle vector processors, respectively, and configured to generate combined vectors $\bar{y}_0$, $\bar{y}_1$, and $\bar{y}_2$, respectively; the second plurality of LPE processors connected to the plurality of MRC processors, respectively, and configured to re-estimate $\hat{\theta}_l$, $\hat{\theta}_m$, and $\hat{\theta}_n$, respectively; and a plurality of decision processors connected to the second plurality of LPE processors, respectively, and each configured to determine a hard estimate of l, m, and n, respectively.

According to one embodiment, an apparatus includes an SVD processor configured to receive a channel matrix H and output samples y of an optimal precoding matrix for H; a first plurality of LPE processors connected to the SVD processor and configured to determine phase estimates $\hat{\theta}_l$ and $\hat{\theta}_n$ of an angle $\theta_l$ of a horizontal DFT index l and a co-phasing $\theta_n$ of cross-polarized antennas of a co-phasing index n, respectively, where l and n are integers; a plurality of angle vector processors connected to the first plurality of LPE processors and two of a second plurality of LPE processors, respectively, and configured to determine angle vectors $\hat{\beta}_0$, $\hat{\beta}_1$, $\hat{\beta}_2$ computed from the phase estimate of $\hat{\theta}_n$, an MRC based estimate of $\hat{\theta}_m$, and an MRC-based estimate of $\hat{\theta}_l$; a plurality of MRC processors connected to the SVD processor and to the plurality of angle vector processors, respectively, and configured to generate combined vectors $\bar{y}_0$, $\bar{y}_1$, and $\bar{y}_2$, respectively; the second plurality of LPE processors connected to the plurality of MRC processors, respectively, and configured to re-estimate $\hat{\theta}_l$, $\hat{\theta}_m$, and $\hat{\theta}_n$, respectively; and a plurality of decision processors connected to the second plurality of LPE processors, respectively, and each configured to determine a hard estimate of l, m, and n, respectively.

According to one embodiment, a method of manufacturing an apparatus includes forming the apparatus on a wafer or a package with at least one other apparatus, wherein the apparatus includes an SVD processor, an LPE processor, and a decision processor; and testing the apparatus, wherein testing the apparatus includes testing the apparatus using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include an apparatus including an SVD processor, an LPE processor, and a decision processor; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1 illustrates an exemplary block diagram of an apparatus for a single DFT codebook, according to one embodiment;

FIG. 2 illustrates an exemplary block diagram of an apparatus for a parallel version of a single layer Kronecker DFT codebook, according to one embodiment;

DETAILED DESCRIPTION OF EMBODIMENTS OF THE PRESENT DISCLOSURE

Figure 3:
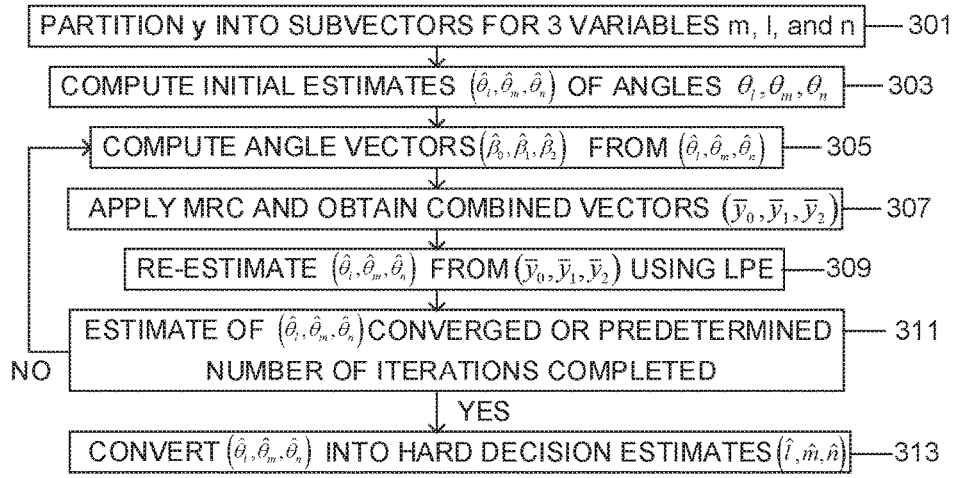
FIG. 3 illustrates an exemplary flowchart for a parallel version of a single layer Kronecker DFT codebook, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

According to one embodiment, the present system and method may be applied to codebooks such as the ones used in LTE, which are based on discrete Fourier transform (DFT) vectors or Kronecker products of DFT vectors. The present system and method exploits the codebook structure by successively estimating the linear phase ramping in a DFT vector.

For example, in the LTE Rel. 13 FD-MIMO codebook, each column of the precoding matrix includes the Kronecker product of 3 DFT vectors: one that determines the beam direction in the horizontal domain, one that determines the beam direction in the vertical domain, and one that determines the co-phasing of cross-polarized antennas. The 3 DFT vectors are indexed by 3 variables that may be denoted respectively as l, m, and n.

According to one embodiment, the present system determines the dominant eigenvector(s) by SVD of the channel matrix. The present system further iteratively estimates coefficients l, m, and n from the linear phase ramping across the elements of the channel eigenvector(s), thereby trying to find the PMI candidate that best matches the phases of the eigenvector(s). The present system and method maps the estimated coefficients l, m, and n to the closest possible PMI indices specified by the LTE standard (e.g., refer to 3GPP TS 36.213, Sec. 7.2.4).

According to one embodiment, the present system and method directly maps the optimal precoder (e.g., obtained through SVD) to one of the available PMI candidates. The present system and method further applies LPE to estimating the coefficient of a DFT vector.

For example, a full dimension (FD)-MIMO system with $N_1$ horizontal antennas, $N_2$ vertical antennas, with oversampling factors $O_1$, $O_2$ in the two respective dimensions, and with cross-polarized antennas (P=2).

$$Q \doteq PN_1N_2$$

denotes the total number of transmit antenna ports and L denotes the rank. The channel matrix is denoted by H, of size $N_R \times Q$, where $N_R$ is the number of antennas at the UE.

In a Kronecker DFT codebook structure such as the one of FD-MIMO, the horizontal and vertical DFT indices are denoted respectively by l and m, and the co-phasing index by n. For two layers, the DFT indices of the second layer are denoted by l', m'. The reported PMI indices are denoted by $i_{11}$, $i_{12}$, $i_2$, and their definitions as well as relation to l, m, n are specified in 3GPP TS 36.213, Sec. 7.2.4.

In the simplified case of a single DFT codebook, there is a single index which is denoted by l. The optimal precoder or reference precoder may be referred to as a matrix $Y=[y_1 \ldots y_L]$ of size $Q\times L$ having as columns the L dominant eigenvectors of $H^HH$. In the case of a single layer, the matrix consists of a single eigenvector, denoted by y.

FIG. 1 illustrates an exemplary block diagram of an apparatus for a single DFT codebook, according to one embodiment.

Referring to FIG. 1, an apparatus 100 includes an SVD processor 101, an LPE processor 103, and a decision processor 105.

According to one embodiment, the SVD processor 101 includes an input for receiving a channel matrix H, and an output for providing samples y of an optimal precoding matrix for H.

According to one embodiment, the LPE processor 103 includes an input connected to the output of the SVD processor 101 for receiving the samples y of the optimal precoding matrix for H, and an output for providing a phase estimation of the samples y of the optimal precoding matrix for H. The notation "LPE[$N_1$-1]" for one-dimensional (1D) LPE indicates that LPE is performed using $N_1$-1 pairs of samples as in Equation (1) below According to one embodiment, the decision processor 105 includes an input connected to the output of the LPE processor 103, and an output for providing an estimate of a DFT coefficient l.

According to one embodiment, the present system estimates the unknown DFT coefficient l by determining an average of multiple distance-1 correlations between all pairs of consecutive samples of y (e.g., $y_i$ and $y_{i+1}$), determining a linear phase estimation $\hat{\theta}_{LPE}$ of such an average, and rounding the determined phase estimate to a nearest integer. According to one embodiment, linear phase estimation $\hat{\theta}_{LPE}$ is estimated as in Equation (1) as follows:

$$\hat{\theta}_{LPE} = \angle(\Sigma_{i=0}^{N_1-2} y_i^* y_{i+1}) \tag{1}$$

where $N_1$ is the size of the DFT vector, $y_i$ and $y_{i+1}$ are consecutive samples of the optimal precoding matrix for H, and "*" indicates complex conjugation.

According to one embodiment, the decision processor 105 includes an input connected to the LPE processor 103 for receiving $\hat{\theta}_{LPE}$, and an output for providing the estimate of the unknown DFT coefficient l. According to one embodiment, the decision processor 105 determines a hard decision concerning the DFT coefficient l estimate as in Equation (2) as follows:

$$\hat{l}_{LPE} = \text{round}\left(\frac{O_1 N_1}{2\pi}\hat{\theta}_{LPE}\right) \bmod(O_1 N_1) \quad (2)$$

where round is a function for rounding to a nearest integer, $O_1$ is an oversampling factor, and $N_1$ is the size of the DFT vector.

FIG. 2 illustrates an exemplary block diagram of an apparatus for a parallel version of a single layer Kronecker DFT codebook, according to one embodiment.

Referring to FIG. 2, an apparatus 200 includes an SVD processor 201, a first plurality of LPE processors 203, 205, and 207, a plurality of angle vector processors 209, 211, and 213, a plurality of maximal ratio combining (MRC) processors 215, 217, and 219, a second plurality of LPE processors 221, 223, and 225, and a plurality of decision processors 227, 229, and 231. While FIG. 2 illustrates the SVD processor 201, the first plurality of LPE processors 203, 205, and 207, the plurality of angle vector processors 209, 211, and 213, the plurality of maximal ratio combining (MRC) processors 215, 217, and 219, the second plurality of LPE processors 221, 223, and 225, and the plurality of decision processors 227, 229, and 231 as separate components, these processors may be included in one or more processors.

FIG. 2 illustrates the apparatus 200 where a codebook is formed by a Kronecker product of 3 DFT vectors (as in LTE FD-MIMO), hence the apparatus 200 includes 3 branches, one for each variable to be estimated (e.g., l, m, n). However, the present disclosure is not limited thereto and may be extended to different numbers of DFT vectors, without deviating from the scope of the present disclosure.

According to one embodiment, the SVD processor 201 includes an input for receiving a channel matrix H, and an output for providing samples y of an optimal precoding matrix for H. The SVD processor 201 is illustrated as providing three subvectors of samples (e.g., $y_0$, $y_1$, and $y_2$).

According to one embodiment, each of the first plurality of LPE processors 203, 205, and 207 includes an input connected to the output of the SVD processor 201 for receiving one of the subvectors $y_0$, $y_1$, and $y_2$ partitioned from samples y of the optimal precoding matrix for H, and an output for providing an initial phase estimation of the corresponding subvectors $y_0$, $y_1$, and $y_2$. The LPE processors 203, 205, and 207 compute initial estimates ($\hat{\theta}_l$, $\hat{\theta}_m$, $\hat{\theta}_n$) of the angles $\theta_l$, $\theta_m$, $\theta_n$ (for example, by two-dimensional (2D) LPE). 2D LPE may be represented by the notation "$LPE_k$ [X,Y]," where X represents the number of sample pairs per vector, Y is the number of vectors combined, and k is an integer indicating the branch. The apparatus 200 includes angles $$\theta_l \doteq \frac{2\pi}{O_1 N_1} l, \theta_m \doteq \frac{2\pi}{O_2 N_2} m, \theta_n \doteq \frac{\pi}{2} n,$$

that represent continuous counterparts of discrete variables l, m, and n. Estimation of $\theta_l$, $\theta_m$, and $\theta_n$ is equivalent to estimating the variables m, l, and n, up to a simple discretization as in Equation (2) above.

According to one embodiment, each of the plurality of angle vector processors 209, 211, and 213, includes an input connected to a plurality of outputs of the first plurality of LPE processors 203, 205, and 207, and an output for providing one of angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$. In the example illustrated in FIG. 2, the angle vector processor 209 is connected to the LPE processors 205 and 207, the angle vector processor 211 is connected to the LPE processors 203 and 207, and the angle vector processor 213 is connected to the LPE processors 203 and 205. However, the present disclosure is not limited thereto.

Each of the plurality of MRC processors 215, 217, and 219 includes an input connected to one of the plurality of angle vector processors 209, 211, and 213, an input connected to the SVD processor 201, and an output for providing one of a combined vector $\bar{y}_0$, $\bar{y}_1$, or $\bar{y}_2$ as expressed in Equations (3), (4), and (5) as follows:

$$\bar{y}_1 = \frac{1}{N_2 P} \sum_{i=0}^{N_2 P - 1} y_{1,i}^e e^{-j\beta_{1,i}} \quad (3)$$

$$\bar{y}_2 = \frac{1}{N_1 P} \sum_{i=0}^{N_1 P - 1} y_{2,i}^e e^{-j\beta_{2,i}} \quad (4)$$

$$\bar{y}_0 = \frac{1}{N_1 N_2} \sum_{i=0}^{N_1 N_2 - 1} y_{0,i}^e e^{-j\beta_{0,i}} \quad (5)$$

Each of the second plurality of LPE processors 221, 223, and 225, includes an input connected to one of the plurality of MRC processors 215, 217, and 219, and an output for providing a re-estimate $\hat{\theta}_l$, $\hat{\theta}_m$, or $\hat{\theta}_n$ of one of the phases of the corresponding subvectors $y_0$, $y_1$, and $y_2$ from one of the combined vectors $\bar{y}_0$, $\bar{y}_1$, or $\bar{y}_2$ using one-dimensional (1D) LPE. 1D LPE may be represented by the notation "$LPE_k$ [X]," where X represents the number of sample pairs per vector, and k is an integer indicating the branch.

Each of the plurality of decision processors 227, 229, and 231 converts one of the re-estimated phases $\hat{\theta}_l$, $\hat{\theta}_m$, $\hat{\theta}_n$ into a hard estimate of one of ($\hat{l},\hat{m},\hat{n}$).

A single iteration is illustrated in FIG. 2. However, the present disclosure is not limited thereto. If there are multiple iterations, the estimates $\hat{\theta}_l$, $\hat{\theta}_m$, $\hat{\theta}_n$ before the plurality of decision processors 227, 229, and 231 are fed back as input to the plurality of angle vector processors 209, 211, and 213.

FIG. 3 illustrates an exemplary flowchart for a parallel version of a single layer Kronecker DFT codebook, which is referred to as iterative linear phase estimation (ILPE), according to one embodiment.

Referring to FIG. 3, samples y of an optimal precoding matrix for H are partitioned, by an SVD processor, into subvectors for each of 3 variables at 301.

At 301, the partitions reflect the order of the Kronecker product of the DFT vectors. For example, if the Kronecker product has the following order: $v_0(n) \otimes (v_1(l) \otimes v_2(m))$. For the innermost variables (in this case, m), y is partitioned into $N_l P$ vectors $\{y_{2,i}\}_{i=0}^{N_1 P - 1}$, each of size $N_2$ having consecutive samples of y.

For the second variable (in this case, l), y is partitioned into $N_2 P$ vectors $\{y_{1,i}\}_{i=0}^{N_2 P - 1}$, each of size $N_1$ having samples taken wth a step of $N_2$ in each of the P equal-length consecutive portions of y. For the outermost variable (in this case, n), y is partitioned into $N_1 N_2$ vectors $\{y_{0,i}\}_{i=0}^{N_1 N_2 - 1}$, each of size P having samples taken with a step $N_1 N_2$, and may be expressed as in Equations (6), (7), and (8) as follows:

$$y_{2,i,k} = y_{k+N_2 i} \text{ for } i \in \{0,1,\ldots,N_1 P - 1\}, k \in \{0,1,\ldots,N_2 - 1\} \quad (6)$$

$$y_{1,i+N_2p,k} = y_{i+N_2k+N_1N_2p} \text{ for } i \in \{0,1,\ldots,N_2-1\}, k \in \{0, 1,\ldots,N_1-1\}, p \in \{0,\ldots,P-1\}, \quad (7)$$

$$y_{0,i,k} = y_{i+N_1N_2k} \text{ for } i \in \{0,1,\ldots,N_1N_2-1\}, k \in \{0,1,\ldots P-1\} \quad (8)$$

Figure 4:
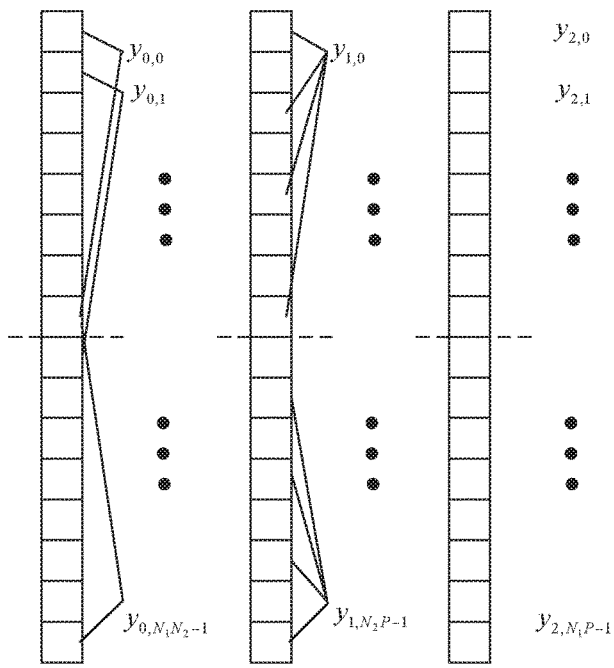
FIG. 4 illustrates an exemplary diagram of vector partition for $N_1=4$, $N_2=2$, $P=2$, according to one embodiment.

FIG. 4 illustrates an exemplary diagram of vector partition for $N_1=4$, $N_2=2$, $P=2$, according to one embodiment.

Referring to FIG. 3, at 303, initial estimates ($\hat{\theta}_l, \hat{\theta}_m, \hat{\theta}_n$) of angles $\theta_l, \theta_m, \theta_n$ are computed by a first plurality of LPE processors. For example, initial estimates ($\hat{\theta}_l, \hat{\theta}_m, \hat{\theta}_n$) of angles $\theta_l, \theta_m, \theta_n$ may be computed by the first plurality of LPE processors using two-dimensional (2D) LPE. However, the present disclosure is not limited thereto. Step 303 may be referred to as two-dimensional (2D) LPE, because multiple vectors are combined before determining the angle, and may be represented by the notation "LPE$_k$[X,Y]," where X represents the number of sample pairs per vector, Y is the number of vectors combined, and k is an integer indicating the branch.

$\hat{\theta}_l, \hat{\theta}_m, \hat{\theta}_n$ may be obtained as expressed in Equations (9), (10), and (11) as follows:

$$\hat{\theta}_l = \angle(\Sigma_{i=0}^{N_2P-1}\Sigma_{k=0}^{N_1-2}y_{1,i,k}*y_{1,i,k+1}) \quad (9)$$

$$\hat{\theta}_m = \angle(\Sigma_{i=0}^{N_1P-1}\Sigma_{k=0}^{N_2-2}y_{2,i,k}*y_{2,i,k+1}) \quad (10)$$

$$\hat{\theta}_n = \angle(\Sigma_{i=0}^{N_1N_2-1}\Sigma_{k=0}^{P-2}y_{0,i,k}*y_{0,i,k+1}) \quad (11)$$

At 305, angle vectors $\hat{\beta}_0, \hat{\beta}_1, \hat{\beta}_2$ from the initial estimates of $\hat{\theta}_l, \hat{\theta}_n, \hat{\theta}_n$ are computed by a plurality of angle vector processors.

The vectors $\beta_0, \beta_1, \beta_2$ are defined as in Equations (12), (13), and (14) as follows:

$$\beta_0 = [0 \ldots (N_2-1)\theta_m \ldots (N_1-1)\theta_l \ldots (N_1-1)\theta_l \ldots +(N_2-1)\theta_m]^T \quad (12)$$

$$\beta_1 = [0, \theta_m \ldots (N_2-1)\theta_m, \theta_n, \theta_n+\theta_m \ldots \theta_n+(N_2-1)\theta_m]^T \quad (13)$$

$$\beta_2 = [0, \theta_l \ldots (N_1-1)\theta_l, \theta_n, \theta_n+\theta_l \ldots \theta_n+(N_1-1)\theta_l]^T \quad (14)$$

where T is a transpose function.

The estimates $\hat{\beta}_0, \hat{\beta}_1, \hat{\beta}_2$ are obtained as in Equations (12), (13), and (14) above, respectively, by replacing $\theta_l, \theta_m, \theta_n$ by their estimates $\hat{\theta}_l, \hat{\theta}_m, \hat{\theta}_n$, respectively, which are either computed at step 303 or, in the case of successive iterations, fed back from a previous iteration.

At 307, MRC is applied to the angle vectors $\hat{\beta}_0, \hat{\beta}_1, \hat{\beta}_2$ by a plurality of MRC processors to obtain combined vectors $\bar{y}_0, \bar{y}_1, \bar{y}_2$ in accordance with Equations (3), (4), and (5) above.

The combined vectors $\bar{y}_0, \bar{y}_1, \bar{y}_2$ are obtained as in Equations (3), (4), and (5) above.

At 309, re-estimates ($\hat{\theta}_l, \hat{\theta}_m, \hat{\theta}_n$) of the angles $\theta_l, \theta_m, \theta_n$ are computed by a second plurality of LPE processors using LPE.

The re-estimates ($\hat{\theta}_l, \hat{\theta}_m, \hat{\theta}_n$) of the angles $\theta_l, \theta_m, \theta_n$ are computed, respectively, from the combined vectors $\bar{y}_0, \bar{y}_1, \bar{y}_2$, using LPE just like in Equation (1) above, and specifically as in Equations (15), (16), and 17) as follows:

$$\hat{\theta}_l = \angle(\Sigma_{i=0}^{N_1-2}\bar{y}_{1,i}*\bar{y}_{1,i+1}) \quad (15)$$

$$\hat{\theta}_m = \angle(\Sigma_{i=0}^{N_2-2}\bar{y}_{2,i}*\bar{y}_{1,i+1}) \quad (16)$$

$$\hat{\theta}_n \angle(\Sigma_{i=0}^{P-2}\bar{y}_{0,i}*\bar{y}_{0,i+1}) \quad (17)$$

At 311, if the re-estimates ($\hat{\theta}_l, \hat{\theta}_m, \hat{\theta}_n$) of the angles $\theta_l, \theta_m, \theta_n$ converge or a predetermined number of iterations occur, proceed to 313, otherwise, proceed to 305.

At 313, the re-estimates $\hat{\theta}_l, \hat{\theta}_m, \hat{\theta}_n$ are converted into hard estimates ($\hat{l}, \hat{m}, \hat{n}$) by a plurality of decision processors.

Conversion from soft estimates to hard estimates is done as in Equation (2) above, and specifically as in Equations (18), (19), and (20) as follows:

$$\hat{l} = \text{round}\left(\frac{O_1N_1}{2\pi}\hat{\theta}_l\right)\text{mod}(O_1N_1) \quad (18)$$

$$\hat{m} = \text{round}\left(\frac{O_2N_2}{2\pi}\hat{\theta}_m\right)\text{mod}(O_2N_2) \quad (19)$$

$$\hat{n} = \text{round}\left(\frac{2}{\pi}\hat{\theta}_n\right)\text{mod}\,4 \quad (20)$$

Figure 5:
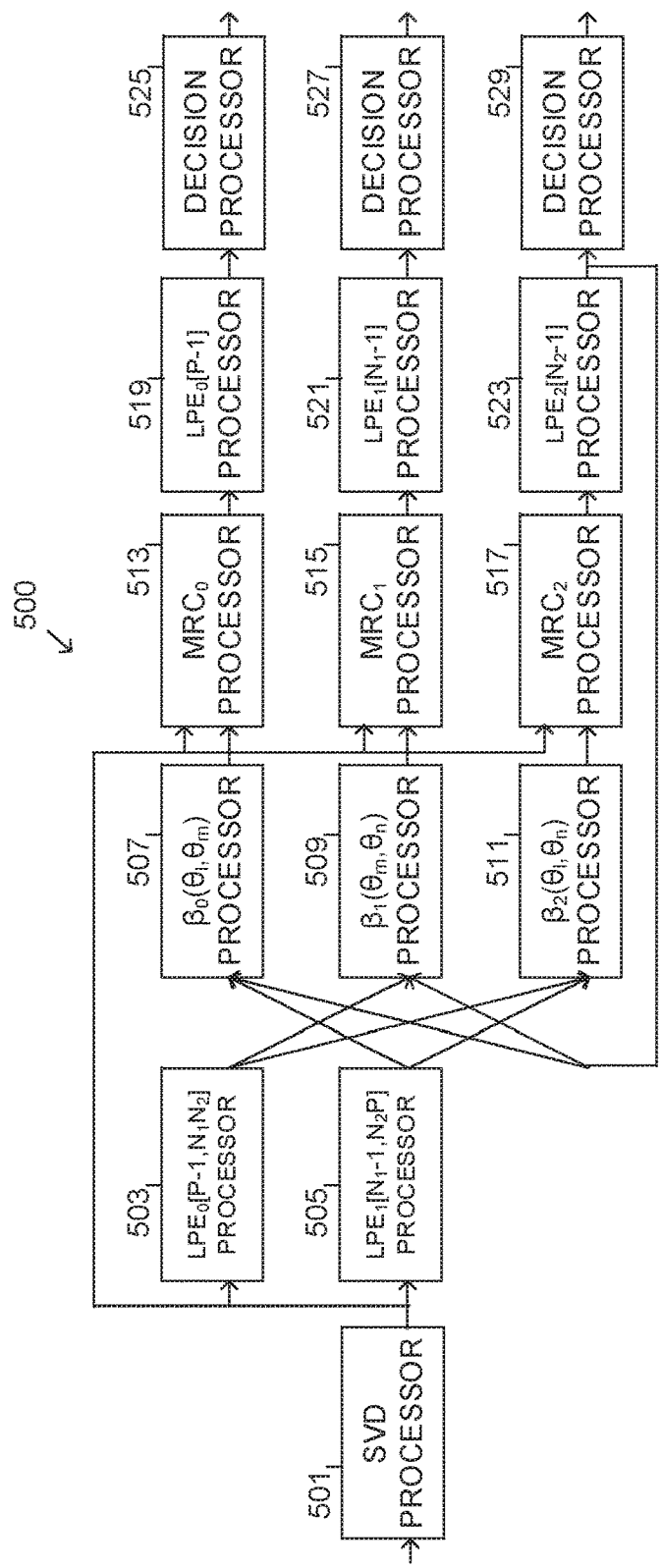
FIG. 5 illustrates an exemplary block diagram of an apparatus for semi-sequential ILPE, according to one embodiment.

FIG. 5 illustrates an exemplary block diagram of an apparatus for semi-sequential ILPE, according to one embodiment.

Referring to FIG. 5, an apparatus 500 includes an SVD processor 501, a first plurality of LPE processors 503 and 505, a plurality of angle vector processors 507, 509, and 511, a plurality of MRC processors 513, 515, and 517, a second plurality of LPE processors 519, 521, and 523, and a plurality of decision processors 525, 527, and 529. While FIG. 5 illustrates the SVD processor 501, the first plurality of LPE processors 503 and 505, the plurality of angle vector processors 507, 509, and 511, the plurality of MRC processors 513, 515, and 517, the second plurality of LPE processors 519, 521, and 523, and the plurality of decision processors 525, 527, and 529 as separate components, these processors may be included in one or more processors.

FIG. 5 illustrates the apparatus 500 where a codebook is formed by a Kronecker product of 3 DFT vectors (as in LTE FD-MIMO). The apparatus 500 may include 3 branches, one for each variable to be estimated (e.g., l, m, n). However, performance of ILPE may be improved while reducing complexity by estimating different variables sequentially. All (e.g., three) variables may be estimated in parallel at each stage, as illustrated in FIG. 2. However, once two variables are initially estimated (e.g., l and n), $\hat{\beta}_2$ may be computed, and m may be estimated by an MRC-based estimation of m. An MRC-based estimation of m is of better quality than an initial estimate of m as in FIG. 2. If the MRC-based estimation of m is used to compute $\hat{\beta}_0$ and $\hat{\beta}_1$, the quality of the estimations of l and n is improved. This is referred to as semi-sequential ILPE. The order of estimating the variable may be m first, then l, n. It is understood that there may be other orders, without deviating from the scope of the present disclosure.

According to one embodiment, the SVD processor 501 includes an input for receiving a channel matrix H, and an output for providing samples y of an optimal precoding matrix for H. The SVD processor 501 is illustrated as providing two subvectors of samples (e.g., $y_0$ and $y_1$).

According to one embodiment, each of the first plurality of LPE processors 503 and 505 includes an input connected to the output of the SVD processor 501 for receiving one of the subvectors $y_0$ and $y_1$ partitioned from samples y of the optimal precoding matrix for H, and an output for providing an initial phase estimation of the corresponding subvectors $y_0$ and $y_1$. The LPE processors 503 and 505 compute initial estimates ($\hat{\theta}_l, \hat{\theta}_n$) of the angles $\theta_l, \theta_n$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch. The apparatus 500 includes angles $$\theta_l \doteq \frac{2\pi}{O_1 N_1} l, \theta_n \doteq \frac{\pi}{2} n,$$

that represent continuous counterparts of discrete variables l and n. Estimation of $\theta_l$ and $\theta_n$ is equivalent to estimating the variables l and n, up to a simple discretization as in Equation (2) above. An MRC-based estimation of m (e.g., $\hat{\theta}_m$) is made as described below.

According to one embodiment, each of the plurality of angle vector processors 507, 509, and 511, includes an input connected to a plurality of outputs of the first plurality of LPE processors 503 and 505 or an output of one of the second plurality of LPE processors 523 from which $\hat{\theta}_m$ is estimated, and an output for providing one of the angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$. In the example illustrated in FIG. 5, the angle vector processor 507 is connected to the LPE processors 505 and 523, the angle vector processor 509 is connected to the LPE processors 503 and 523, and the angle vector processor 511 is connected to the LPE processors 503 and 505. However, the present disclosure is not limited thereto.

Each of the plurality of MRC processors 513, 515, and 517 includes an input connected to one of the plurality of angle vector processors 507, 509, and 511, an input from the SVD processor 501, and an output for providing one of a combined vector $\bar{y}_0$, $\bar{y}_1$, or $\bar{y}_2$ as expressed in Equations (3), (4), and (5) above.

Each of the second plurality of LPE processors 519, 521, and 523, includes an input connected to one of the plurality of MRC processors 513, 515, and 517, and an output for providing a re-estimate $\hat{\theta}_l$, $\hat{\theta}_m$, or $\hat{\theta}_n$, of either one of the phases of the corresponding subvectors $y_0$ and $y_1$, or both $y_0$ and $y_1$ in the case of estimating $\hat{\theta}_m$, from one of the combined vectors $\bar{y}_0$ and $\bar{y}_1$, or $\bar{y}_2$ using LPE. The output of the LPE processor 523 is connected to the inputs of the angle vector processors 507 and 509 for providing the MRC-based estimation of m (e.g., $\hat{\theta}_m$).

Each of the plurality of decision processors 525, 527, and 529 converts one of the re-estimated phases $\hat{\theta}_l$ or $\hat{\theta}_n$ and the MRC-based estimation of m (e.g., $\hat{\theta}_m$) into a hard estimate of one of ($\hat{l}$, $\hat{m}$, $\hat{n}$).

A single iteration is illustrated in FIG. 5. However, the present disclosure is not limited thereto. If there are multiple iterations, the estimates $\hat{\theta}_l$, $\hat{\theta}_m$, $\hat{\theta}_n$ before the plurality of decision processors 525, 527, and 529 are fed back as input to the plurality of angle vector processors 507, 509, and 511.

Figure 6:
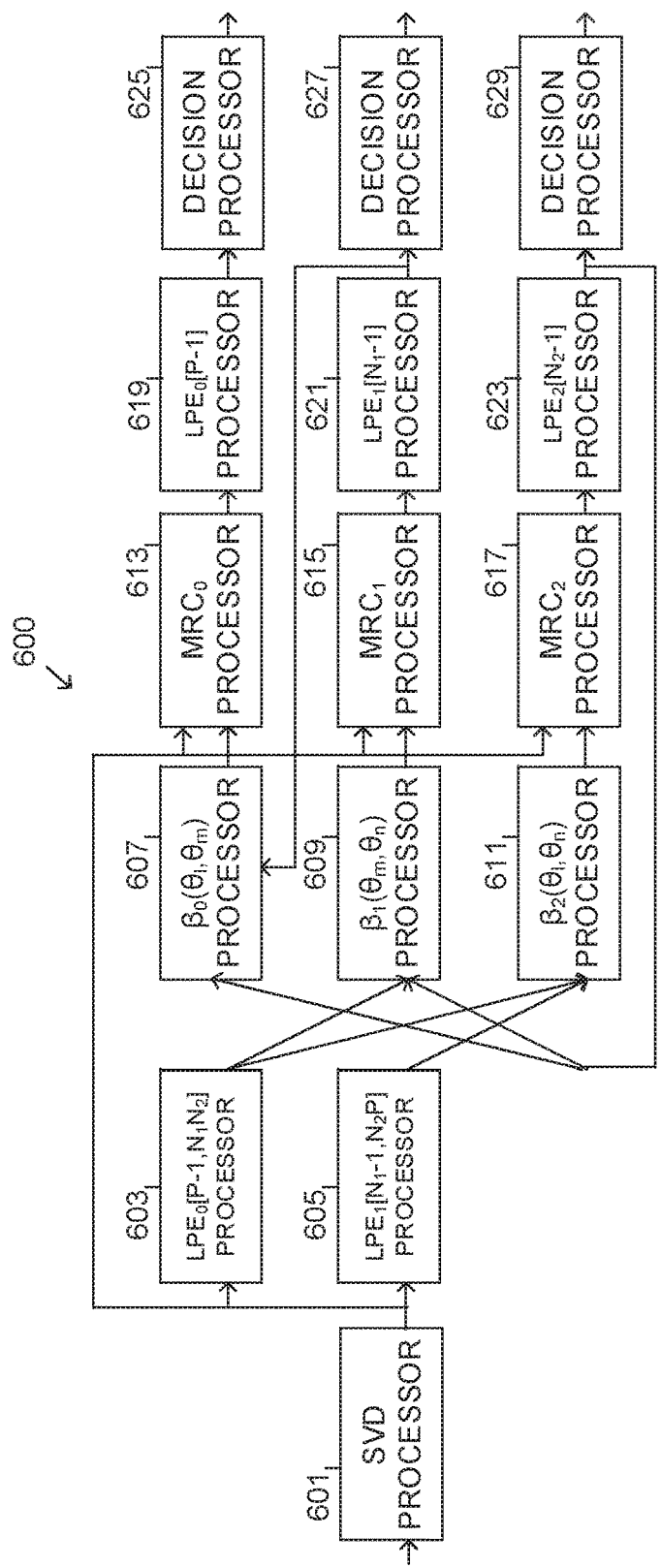
FIG. 6 illustrates an exemplary block diagram of an apparatus for sequential ILPE, according to one embodiment.

FIG. 6 illustrates an exemplary block diagram of an apparatus for sequential ILPE, according to one, according to one embodiment. According to one embodiment, the present disclosure may estimate all three variables sequentially (e.g., first m, then l, and finally n).

Referring to FIG. 6, an apparatus 600 includes an SVD processor 601, a first plurality of LPE processors 603 and 605, a plurality of angle vector processors 607, 609, and 611, a plurality of MRC processors 613, 615, and 617, a second plurality of LPE processors 619, 621, and 623, and a plurality of decision processors 625, 627, and 629. While FIG. 6 illustrates the SVD processor 601, the first plurality of LPE processors 603 and 605, the plurality of angle vector processors 607, 609, and 611, the plurality of MRC processors 613, 615, and 617, the second plurality of LPE processors 619, 621, and 623, and the plurality of decision processors 625, 627, and 629 as separate components, these processors may be included in one or more processors.

FIG. 6 illustrates the apparatus 600 where a codebook is formed by a Kronecker product of 3 DFT vectors (as in LTE FD-MIMO). The apparatus 600 may include 3 branches, one for each variable to be estimated (e.g., l, m, n). However, performance of ILPE may be improved while reducing complexity by estimating different variables sequentially. All (e.g., three) variables may be estimated in parallel at each stage, as illustrated in FIG. 2. However, once two variables are initially estimated (e.g., l and n), $\hat{\beta}_2$ may be computed, and m may be estimated by an MRC-based estimation of m. An MRC-based estimation of m is of better quality than an initial estimate of m as in FIG. 2. If the MRC-based estimation of m is used to compute $\hat{\beta}_1$, the quality of the estimation of l is improved. In addition, If $\hat{\beta}_1$ is then used to compute $\hat{\beta}_0$, the quality of the estimation of l is improved. This is referred to as sequential ILPE. The order of estimating the variable may be m first, l second, and n third. It is understood that there may be other orders, without deviating from the scope of the present disclosure.

According to one embodiment, the SVD processor 601 includes an input for receiving a channel matrix H, and an output for providing samples y of an optimal precoding matrix for H. The SVD processor 601 is illustrated as providing two subvectors of samples (e.g., $y_0$ and $y_1$).

According to one embodiment, each of the first plurality of LPE processors 603 and 605 includes an input connected to the output of the SVD processor 601 for receiving one of the subvectors $y_0$ and $y_1$ partitioned from samples y of the optimal precoding matrix for H, and an output for providing an initial phase estimation of the corresponding subvectors $y_0$ and $y_1$. The LPE processors 603 and 605 compute initial estimates ($\hat{\theta}_l$, $\hat{\theta}_n$) of the angles $\theta_l$, $\theta_n$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch. The apparatus 600 includes angles $$\theta_l \doteq \frac{2\pi}{O_1 N_1} l, \theta_n \doteq \frac{\pi}{2} n,$$

that represent continuous counterparts of discrete variables l and n. Estimation of $\theta_l$ and $\theta_n$ is equivalent to estimating the variables l and n, up to a simple discretization as in Equation (2) above. An MRC-based estimation of m (e.g., $\hat{\theta}_m$) is made as described below.

According to one embodiment, each of the plurality of angle vector processors 607, 609 and 611, includes an input connected to a plurality of outputs of the first plurality of LPE processors 603 and 605, an output of one of the second plurality of LPE processors 623 from which $\hat{\theta}_m$ is estimated, an output of one of the second plurality of LPE processors 621 from which $\hat{\theta}_l$ is estimated, and an output for providing one of the angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$. In the example illustrated in FIG. 6, the angle vector processor 607 is connected to the LPE processor 621, the angle vector processor 609 is connected to the LPE processors 603 and 623, and the angle vector processor 611 is connected to the LPE processors 603 and 605. However, the present disclosure is not limited thereto.

Each of the plurality of MRC processors 613, 615, and 617 includes an input connected to one of the plurality of angle vector processors 607, 609, and 611, an input connected to the SVD processor 601, and an output for providing one of a combined vector $\bar{y}_1$, $\bar{y}_1$, $\bar{y}_2$ as expressed in Equations (3), (4), and (5) above.

Each of the second plurality of LPE processors 619, 621, and 623, includes an input connected to one of the plurality of MRC processors 613, 615, and 617, and an output for providing a re-estimate $\hat{\theta}_l$, $\hat{\theta}_m$, or $\hat{\theta}_n$, from either both $y_0$ and $y_1$ in the case of estimating $\hat{\theta}_m$, both $y_0$ and the MRC-based estimation of m (e.g., $\hat{\theta}_m$) that provides an MRC-based estimation of $\hat{\theta}_l$, and the MRC-based estimation of $\hat{\theta}_l$ that provides an MRC-based estimation of $\hat{\theta}_n$, and from one of the combined vectors $\bar{y}_0$ and $\bar{y}_1$, or $\bar{y}_2$ using LPE. The output of LPE processor 623 is connected to the input of the angle vector processor 609 for providing the MRC-based estimation of m (e.g., $\hat{\theta}_m$), and the output of the LPE processor 621 is connected to the input of the angle vector processor 607 for providing the MRC-based estimation of l (e.g., $\bar{\theta}_l$).

Each of the plurality of decision processors 625, 627, and 629 converts one of the MRC-based estimation of m (e.g., $\hat{\theta}_m$), the MRC-based estimation of l (e.g., $\hat{\theta}_l$), and the MRC-based estimation of n (e.g., $\hat{\theta}_n$) into a hard estimate of one of ($\hat{l}, \hat{m}, \hat{n}$).

A single iteration is illustrated in FIG. 6. However, the present disclosure is not limited thereto. If there are multiple iterations, the estimates $\hat{\theta}_l$, $\hat{\theta}_m$, $\hat{\theta}_n$ before the plurality of decision processors 625, 627, and 629 are fed back as input to the plurality of angle vector processors 607, 609, and 611.

Figure 7:
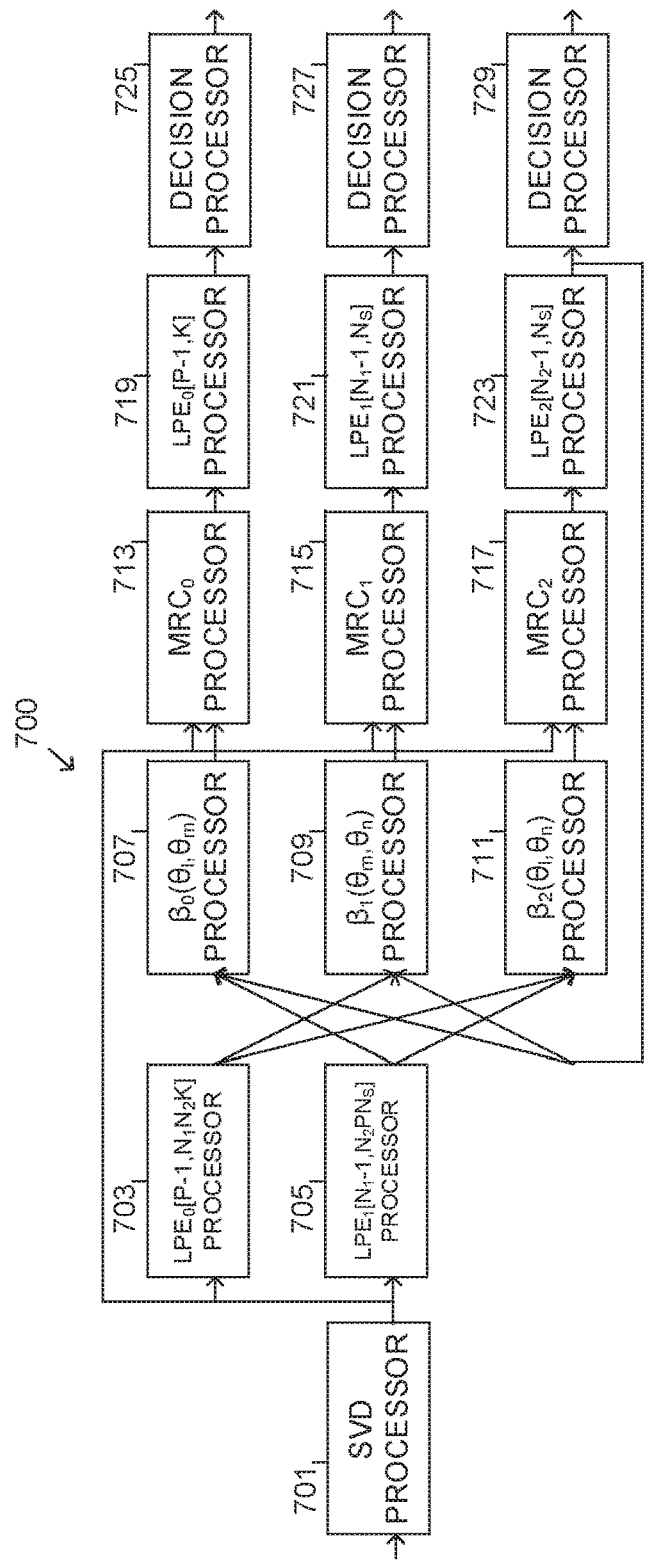
FIG. 7 illustrates an exemplary block diagram of an apparatus for wideband/subband ILPE, according to one embodiment.

FIG. 7 illustrates an exemplary block diagram of an apparatus for wideband/subband ILPE, according to one embodiment.

In some cases (e.g., with LTE FD-MIMO reporting mode 3-2), part of the PMI report may be wideband (WB), while another part may be per-subband (SB). For example, in the case where l, m is wideband and n is per subband. $N_S$ may be defined as the total number of subcarriers (e.g., 100) and K as the number of subcarriers in one subband (e.g., 8 or 4 for edge subbands). The present disclosure may be modified in a number or ways as follows. SVD may be performed per-subcarrier (e.g., the output will be a set of eigenvectors $\{y_{s,i}\}_{i=0}^{N_S-1}$, one for each subcarrier). For wideband variables (e.g., l), all $N_S$ subcarriers may be combined in the LPE processors. For narrowband variables (e.g., n), K subcarriers per subband may be combined in the LPE processors. Consequently, there may be different $\hat{\theta}_n$, $\hat{\beta}_1$, $\hat{\beta}_2$ for different subbands, whereas $\hat{\theta}_l$, $\hat{\theta}_m$, $\hat{\beta}_0$ are unique for the entire band. MRC may be performed separately for each subcarrier. Consequently, the MRC outputs $\bar{y}_0$, $\bar{y}_1$, $\bar{y}_2$ may be different for different subcarriers. The final LPE processors may perform 2D-LPE, where multiple subcarriers may be combined (e.g., K subcarriers for variable n and $N_S$ subcarriers for the wideband variables). The hard decision processors may be per-subband for variable n and wideband for the other variables. FIG. 7 may be based on the semi-sequential embodiment illustrated in FIG. 5.

Referring to FIG. 7, an apparatus 700 includes an SVD processor 701, a first plurality of LPE processors 703 and 705, a plurality of angle vector processors 707, 709, and 711, a plurality of MRC processors 713, 715, and 717, a second plurality of LPE processors 719, 721, and 723, and a plurality of decision processors 725, 727, and 729. The SVD processor 701 and the MRC processors 713, 715, and 717 represent operations performed for each individual subcarrier; the LPE processors 703 and 719, the angle vector processors 709 and 711, and the decision processor 725 represent operations performed for each individual subband); the LPE processors 705, 721, and 723, the angle vector processors 707, and the decision processors 727 and 729 represent wideband operations. However, the present disclosure is not limited thereto, and other WB/SB embodiments are possible. While FIG. 7 illustrates the SVD processor 701, the first plurality of LPE processors 703 and 705, the plurality of angle vector processors 707, 709, and 711, the plurality of MRC processors 713, 715, and 717, the second plurality of LPE processors 719, 721, and 723, and the plurality of decision processors 725, 727, and 729 as separate components, these processors may be included in one or more processors.

FIG. 7 illustrates the apparatus 700 where a codebook is formed by a Kronecker product of 3 DFT vectors (as in LTE FD-MIMO). The apparatus 700 may include 3 branches, one for each variable to be estimated (e.g., l, m, n). However, performance of ILPE may be improved while reducing complexity by estimating different variables sequentially. All (e.g., three) variables may be estimated in parallel at each stage, as illustrated in FIG. 2. However, once two variables are initially estimated (e.g., l and n), $\hat{\beta}_2$ may be computed, and m may be estimated by an MRC-based estimation of m. An MRC-based estimation of m is of better quality than an initial estimate of m as in FIG. 2. If the MRC-based estimation of m is used to compute $\hat{\beta}_0$ and $\hat{\beta}_1$, the quality of the estimations of l and n is improved. This is referred to as semi-sequential ILPE. The order of estimating the variable may be m first, then l, n. It is understood that there may be other orders, without deviating from the scope of the present disclosure.

According to one embodiment, the SVD processor 701 includes an input for receiving a channel matrix H, and an output for providing samples y of an optimal precoding matrix for H. The SVD processor 701 is illustrated as providing two subvectors of samples (e.g., $y_0$ and $y_1$).

According to one embodiment, each of the first plurality of LPE processors 703 and 705 includes an input connected to the output of the SVD processor 701 for receiving one of the subvectors $y_0$ and $y_1$ partitioned from samples y of the optimal precoding matrix for H, and an output for providing an initial phase estimation of the corresponding subvectors $y_0$ and $y_1$. The LPE processors 703 and 705 compute initial estimates ($\hat{\theta}_l$, $\hat{\theta}_n$) of the angles $\theta_l$, $\theta_n$ (for example, by two-dimensional (2D) LPE). 2D LPE may be represented by the notation "$LPE_k[X,Y]$," where X represents the number of sample pairs per vector, Y is the number of vectors combined, and k is an integer indicating the branch. The apparatus 700 includes angles $$\theta_l \doteq \frac{2\pi}{O_1 N_1} l, \theta_n \doteq \frac{\pi}{2} n,$$

that represent continuous counterparts of discrete variables l and n. Estimation of $\theta_l$ and $\theta_n$ is equivalent to estimating the variables l and n, up to a simple discretization as in Equation (2) above. An MRC-based estimation of m (e.g., $\hat{\theta}_m$) is made as described below.

According to one embodiment, each of the plurality of angle vector processors 707, 709, and 711, includes an input connected to a plurality of outputs of the first plurality of LPE processors 703 and 705 or an output of one of the second plurality of LPE processors 723 from which $\hat{\theta}_m$ is estimated, and an output for providing one of the angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$. In the example illustrated in FIG. 7, the angle vector processor 707 is connected to the LPE processors 705 and 723, the angle vector processor 709 is connected to the LPE processors 703 and 723, and the angle vector processor 711 is connected to the LPE processors 703 and 705. However, the present disclosure is not limited thereto.

Each of the plurality of MRC processors 713, 715, and 717 includes a first input connected to one of the plurality of angle vector processors 707, 709, and 711, a second input connected to the output of the SVD processor 701, and an output for providing one of a combined vector $\bar{y}_0$, $\bar{y}_1$, or $\bar{y}_2$ as expressed in Equations (3), (4), and (5) above.

Each of the second plurality of LPE processors 719, 721, and 723, includes an input connected to one of the plurality of MRC processors 713, 715, and 717, and an output for providing a re-estimate $\hat{\theta}_l$, $\hat{\theta}_m$, or $\hat{\theta}_n$ of either one of the phases of the corresponding subvectors $y_0$ and $y_1$, or both $y_0$ and $y_1$ in the case of estimating $\hat{\theta}_m$, from one of the combined vectors $\bar{y}_0$ and $\bar{y}_1$, or $\bar{y}_2$ using LPE. The output of the LPE processor 723 is connected to the inputs of the angle vector processors 707 and 709 for providing the MRC-based estimation of m (e.g., $\hat{\theta}_m$).

Each of the plurality of decision processors 725, 727, and 729 converts one of the re-estimated phases $\hat{\theta}_l$ or $\hat{\theta}_n$ and the MRC-based estimation of m (e.g., $\hat{\theta}_m$) into a hard estimate of one of ($\hat{l}, \hat{m}, \hat{n}$).

A single iteration is illustrated in FIG. 7. However, the present disclosure is not limited thereto. If there are multiple iterations, the estimates $\hat{\theta}_l$, $\hat{\theta}_m$, $\hat{\theta}_n$ before the plurality of decision processors 725, 727, and 729 are fed back as input to the plurality of angle vector processors 707, 709, and 711.

Figure 8:
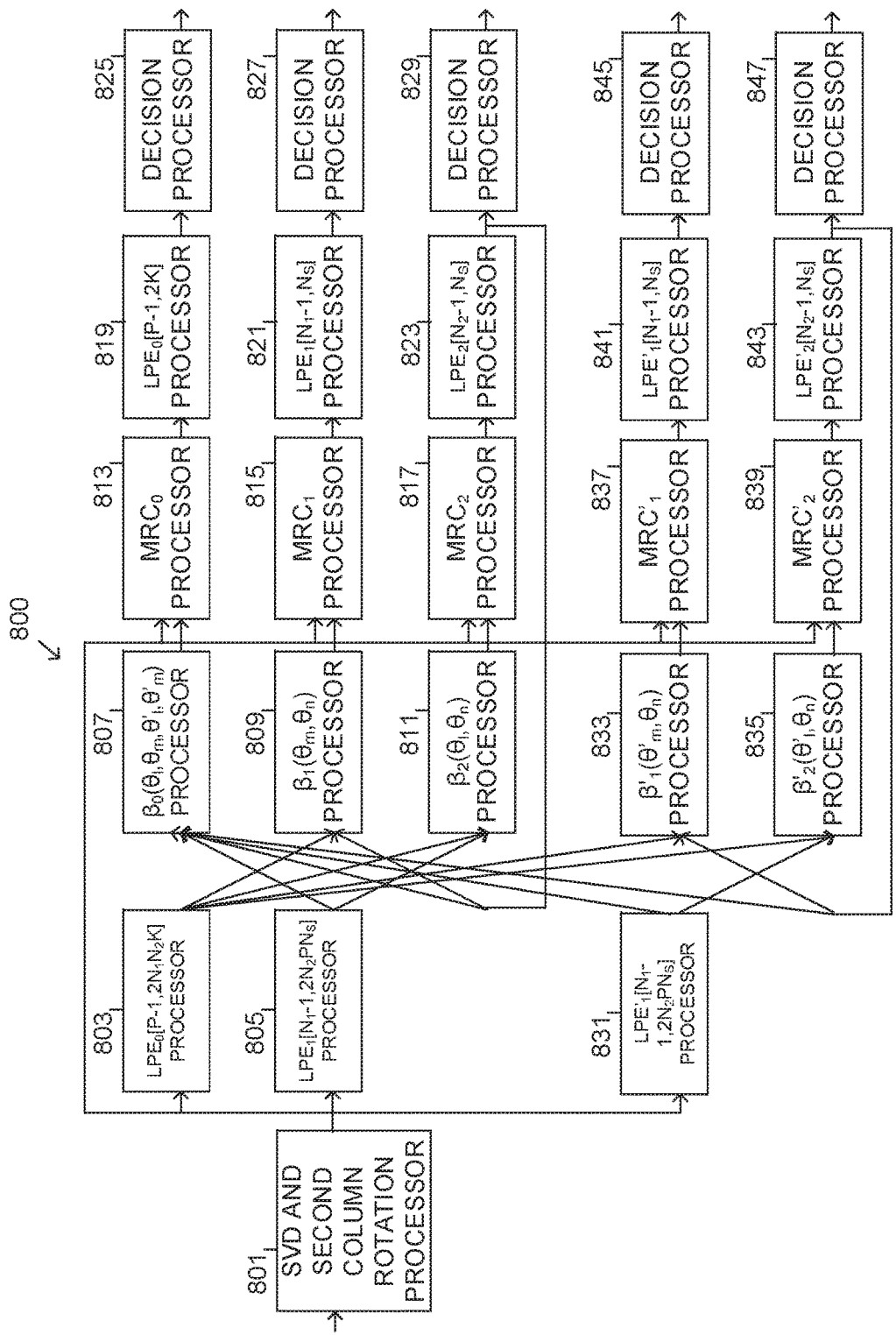
FIG. 8 illustrates an exemplary block diagram of an apparatus for a Kronecker DFT codebook with multiple and separate layers, according to one embodiment.

FIG. 8 illustrates an exemplary block diagram of an apparatus for a Kronecker DFT codebook with multiple and separate layers, according to one embodiment. FIG. 8 illustrates an exemplary block diagram for a separate layer (SL) process built upon a semi-sequential embodiment with WB/SB processing. However, the present disclosure is not limited thereto. Other combinations are possible, e.g., an SL process built upon an embodiments with or without WB/SB processing. In addition, the present disclosure may be extended to more than 2 layers by adding more branches for variables (e.g., l",m').

In a case of two layers, a codebook for two layers may be of the form expressed in Equation (21) as follows:

$$W_{rank2}(l, l', m, m', n) = \frac{1}{\sqrt{2Q}} \begin{bmatrix} v(l, m) & v(l', m') \\ \varphi(n)v(l, m) & -\varphi(n)v(l', m') \end{bmatrix} \quad (21)$$

As a preliminary step, the second half of the second eigenvector is multiplied by −1, so as to match the codebook structure. For example, if the two dominant eigenvectors are denoted as [$y_1$ $y_2$], $y_2$ may be processed as expressed in Equation (22) as follows:

$$y_2' = y_2 \odot \begin{bmatrix} 1 \\ \vdots \\ 1 \\ -1 \\ \vdots \\ -1 \end{bmatrix} \quad (22)$$

where ⊙ indicates an element-wise product. The above pre-processing may be generalized to any phase rotation of any subset of the second column with respect to the first column.

After the pre-processing step, variables l, m, l', m' are estimated independently. Thus, the embodiment is similar to the embodiment for a single layer, except that there are two additional branches for l' and m'. n may be common to both layers.

In some cases (e.g., with LTE FD-MIMO reporting mode 3-2), part of the PMI report may be wideband (WB), while another part may be per-subband (SB). For example, in the case where l, m is wideband and n is per subband. $N_S$ may be defined as the total number of subcarriers (e.g., 100) and K as the number of subcarriers in one subband (e.g., 8 or 4 for edge subbands). The present disclosure may be modified in a number or ways as follows. SVD may be performed per-subcarrier (e.g., the output will be a set of eigenvectors $\{y_i\}_{i=0}^{N_S-1}$, one for each subcarrier). For wideband variables (e.g., l), all $N_S$ subcarriers may be combined in the LPE processors. For narrowband variables (e.g., n), K subcarriers per subband may be combined in the LPE processors. Consequently, there may be different $\hat{\theta}_n$, $\hat{\beta}_1$, $\hat{\beta}_2$ for different subbands, whereas $\hat{\theta}_l$, $\hat{\theta}_m$, $\hat{\beta}_0$ are unique for the entire band. MRC may be performed separately for each subcarrier. Consequently, the MRC outputs $\bar{y}_0$, $\bar{y}_1$, $\bar{y}_2$ may be different for different subcarriers. The final LPE processors may perform 2D-LPE, where multiple subcarriers may be combined (e.g., K subcarriers for variable n and $N_S$ subcarriers for the wideband variables). The hard decision processors may be per-subband for variable n and wideband for the other variables. FIG. 8 may be based on the semi-sequential embodiment illustrated in FIG. 5.

Referring to FIG. 8, an apparatus 800 includes an SVD processor 801, a first layer, and a second layer.

FIG. 8 illustrates the apparatus 800 where a codebook is formed by a Kronecker product of 3 DFT vectors (as in LTE FD-MIMO). The apparatus 800 may include 3 branches, one for each variable to be estimated (e.g., l, m, n). However, performance of ILPE may be improved while reducing complexity by estimating different variables sequentially. All (e.g., three) variables may be estimated in parallel at each stage, as illustrated in FIG. 2. However, once two variables are initially estimated (e.g., l and n), $\hat{\beta}_2$ may be computed, and m may be estimated by an MRC-based estimation of m. An MRC-based estimation of m is of better quality than an initial estimate of m as in FIG. 2. If the MRC-based estimation of m is used to compute $\hat{\beta}_0$ and $\hat{\beta}_1$, the quality of the estimations of l and n is improved. This is referred to as semi-sequential ILPE. The order of estimating the variable may be m first, then l, n. It is understood that there may be other orders, without deviating from the scope of the present disclosure.

According to one embodiment, the SVD processor 801 includes an input for receiving a channel matrix H, and an output for providing samples y of an optimal precoding matrix for H. The SVD processor 801 is illustrated as providing two subvectors of samples (e.g., $y_0$ and $y_1$). The SVD processor 801 rotates a second column as described above.

The first layer includes a first plurality of LPE processors 803 and 805, a first plurality of angle vector processors 807, 809, and 811, a first plurality of MRC processors 813, 815, and 817, a second plurality of LPE processors 819, 821, and 823, and a first plurality of decision processors 825, 827, and 829. The SVD processor 801, the LPE processors 803 and 819, the angle vector processors 809 and 811, the MRC processors 813, 815, and 817, and the decision processor 825 represent operations performed for each individual subband (or subcarrier, for MRC), while the LPE processors 805, 821, and 823, the angle vector processors 807, and the decision processors 827 and 829 represent wideband operations. However, the present disclosure is not limited thereto, and other WB/SB embodiments are possible.

According to one embodiment, each of the first plurality of LPE processors 803 and 805 includes an input connected to the output of the SVD processor 801 for receiving one of the subvectors $y_0$ and $y_1$ partitioned from samples y of the optimal precoding matrix for H, and an output for providing an initial phase estimation of the corresponding subvectors $y_0$ and $y_1$. The LPE processors 803 and 805 compute initial estimates $(\hat{\theta}_l, \hat{\theta}_n)$ of the angles $\theta_l, \theta_n$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch. The apparatus 800 includes angles $$\theta_l \doteq \frac{2\pi}{O_1 N_1} l, \theta_n \doteq \frac{\pi}{2} n,$$

that represent continuous counterparts of discrete variables l and n. Estimation of $\theta_l$ and $\theta_n$ is equivalent to estimating the variables l and n, up to a simple discretization as in Equation (2) above. An MRC-based estimation of m (e.g., $\hat{\theta}_m$) is made as described below.

According to one embodiment, each of the first plurality of angle vector processors 807, 809, and 811, includes an input connected to a plurality of outputs of the first plurality of LPE processors 803 and 805 or an output of one of the second plurality of LPE processors 823 from which $\hat{\theta}_m$ is estimated, and an output for providing one of the angle vectors $\hat{\beta}_0, \hat{\beta}_1, \hat{\beta}_2$ computed from a plurality of the initial phase estimates $\hat{\theta}_l, \hat{\theta}_m, \hat{\theta}_n$. In the example illustrated in FIG. 8, the angle vector processor 807 is connected to the LPE processors 805, 823, 831, and 843, the angle vector processor 809 is connected to the LPE processors 803 and 823, and the angle vector processor 811 is connected to the LPE processors 803 and 805. However, the present disclosure is not limited thereto.

Each of the first plurality of MRC processors 813, 815, and 817 includes a first input connected to one of the plurality of angle vector processors 807, 809, and 811, a second input connected to the output of the SVD processor 801, and an output for providing one of a combined vector $\bar{y}_0, \bar{y}_1$, or $\bar{y}_2$ as expressed in Equations (3), (4), and (5) above.

Each of the second plurality of LPE processors 819, 821, and 823, includes an input connected to one of the plurality of MRC processors 813, 815, and 817, and an output for providing a re-estimate $\hat{\theta}_l, \hat{\theta}_m$, or $\hat{\theta}_n$ of either one of the phases of the corresponding subvectors $y_0$ and $y_1$, or both $y_0$ and $y_1$ in the case of estimating $\hat{\theta}_m$, from one of the combined vectors $\bar{y}_0$ and $\bar{y}_1$, or $\bar{y}_2$ using LPE. The output of the LPE processor 823 is connected to the inputs of the angle vector processors 807 and 809 for providing the MRC-based estimation of m (e.g., $\hat{\theta}_m$).

Each of the first plurality of decision processors 825, 827, and 829 converts one of the re-estimated phases $\hat{\theta}_l$ or $\hat{\theta}_n$ and the MRC-based estimation of m (e.g., $\hat{\theta}_m$) into a hard estimate of one of $(\hat{l}, \hat{m}, \hat{n})$.

A single iteration is illustrated in FIG. 8. However, the present disclosure is not limited thereto. If there are multiple iterations, the estimates $\hat{\theta}_l, \hat{\theta}_m, \hat{\theta}_n$ before the first plurality of decision processors 825, 827, and 829 are fed back as input to the first plurality of angle vector processors 807, 809, and 811.

The second layer includes an LPE processor 831, a second plurality of angle vector processors 833 and 835, a second plurality of MRC processors 837 and 839, a third plurality of LPE processors 841 and 843, and a second plurality of decision processors 845 and 847. The MRC processors 837 and 839 represent operations performed for each individual subcarrier; the angle vector processors 833 and 835 represent operations performed for each individual subband; the LPE processors 831, 841, and 843, and the decision processors 845 and 847 represent wideband operations. However, the present disclosure is not limited thereto, and other WB/SB embodiments are possible.

According to one embodiment, the LPE processor 831 includes an input connected to the output of the SVD processor 801 for receiving one of the subvectors $y_0$ and $y_1$ partitioned from samples y of the optimal precoding matrix for H, and an output for providing an initial phase estimation of the corresponding subvectors $y_0$ and $y_1$. The LPE processor 831 computes an initial estimate $(\hat{\theta}_{l'})$ of the angle $\theta_l$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch. An MRC-based estimation of m' (e.g., $\hat{\theta}_{m'}$) is made as described below.

According to one embodiment, each of the plurality of angle vector processors 833 and 835, includes an input connected to a plurality of outputs of the first plurality of LPE processors 803 and 805 and either an output of the LPE processor 831 or an output of one of the second plurality of LPE processors 843 from which $\hat{\theta}_{m'}$ is estimated, and an output for providing one of the angle vectors $\hat{\beta}_2', \hat{\beta}_2'$ computed from a plurality of the initial phase estimates $\hat{\theta}_n, \hat{\theta}_{m'}, \hat{\theta}_{l'}$. In the example illustrated in FIG. 8, the angle vector processor 833 is connected to the LPE processors 803 and 843, and the angle vector processor 835 is connected to the LPE processors 803 and 831. The LPE processor 831 is also connected to the angle vector processors 807. However, the present disclosure is not limited thereto.

Each of the plurality of MRC processors 837 and 839 includes a first input connected to one of the plurality of angle vector processors 833 and 835, a second input connected to the output of the SVD processor 801, and an output for providing one of a combined vector $\bar{y}_1'$, or $\bar{y}_2'$, which is expressed similarly to Equations (3) and (4) above.

Each of the third plurality of LPE processors 841 and 843, includes an input connected to one of the plurality of MRC processors 837 and 839, and an output for providing a re-estimate $\hat{\theta}_l'$ or $\hat{\theta}_m'$ of either one of the phases of the corresponding subvectors $\bar{y}_1'$, or $\bar{y}_2'$ in the case or estimating $\hat{\theta}_{m'}$, from one of the combined vectors $\bar{y}_1$, or $\bar{y}_2$ using LPE. The output of the LPE processor 843 is connected to the input of the angle vector processor 833 for providing the MRC-based estimation of m' (e.g., $\hat{\theta}_{m'}$).

Each of the second plurality of decision processors 845 and 847 converts one of the re-estimated phases $\hat{\theta}_l'$; or $\hat{\theta}_m'$ and the MRC-based estimation of m' (e.g., $\hat{\theta}_{m'}$) into a hard estimate of one of $(\hat{l}', \hat{m}')$.

A single iteration is illustrated in FIG. 8. However, the present disclosure is not limited thereto. If there are multiple iterations, the estimates $\hat{\theta}_l'$ and $\hat{\theta}_m'$ before the second plurality of decision processors 845 and 847 are fed back as input to the second plurality of angle vector processors 833 and 835.

While FIG. 8 illustrates the various processors as separate components, they may be included in one or more processors.

Figure 9:
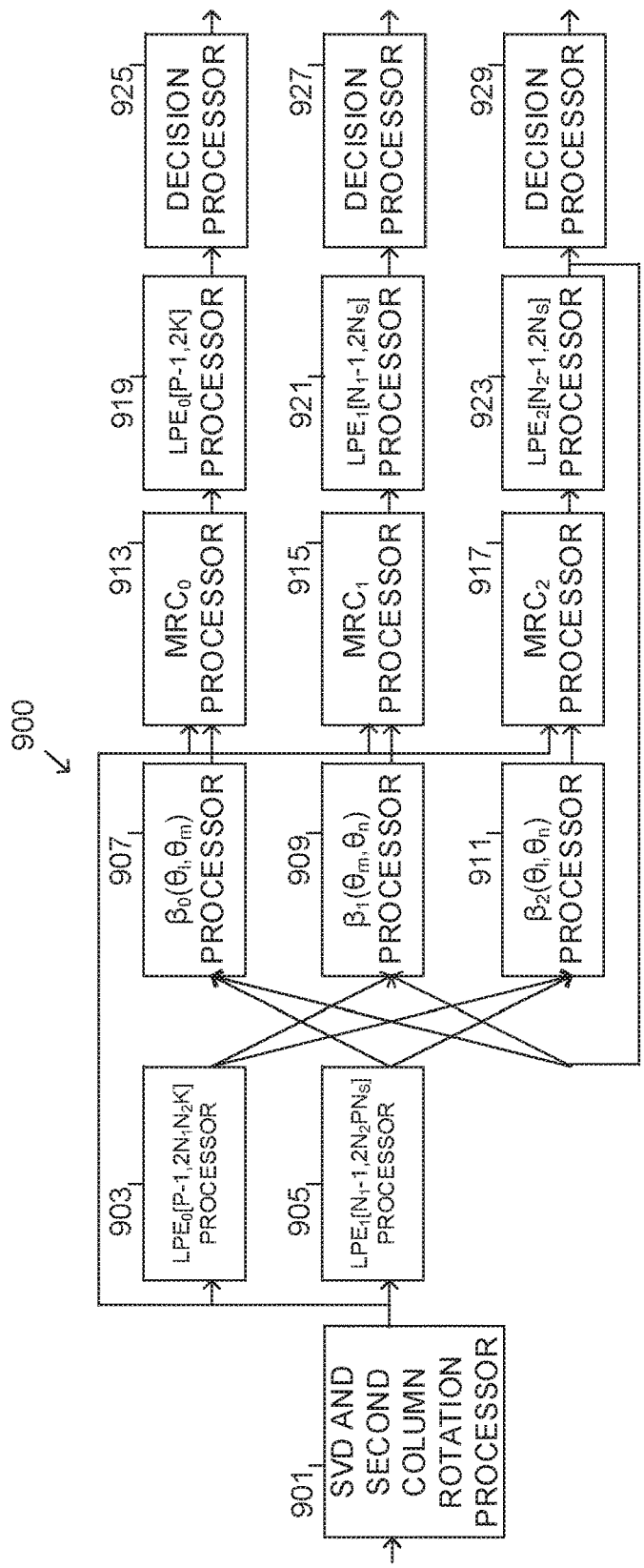
FIG. 9 illustrates an exemplary block diagram of an apparatus for a Kronecker DFT codebook with multiple and joint layers, according to one embodiment.

FIG. 9 illustrates an exemplary block diagram of an apparatus for a Kronecker DFT codebook with multiple and joint layers (JL), according to one embodiment.

According to one embodiment, a joint layer embodiment may be developed for cases in which l=l' and m=m' (or may be approximated as such). As a preliminary step, the second half of the second eigenvector is multiplied by −1, so as to match the codebook structure. For example, if the two dominant eigenvectors are denoted as [$y_1$ $y_2$], $y_2$ may be processed as expressed in Equation (22) above.

Since the unknown variables are the same for both layers, this embodiment is an extension of the single-layer case, just with twice as many samples. Thus, the number of samples in each LPE block is increased by a factor 2. The embodiment may be applied in its semi-sequential version with WB/SB processing, but other combinations are possible. If there are more than 2 layers, the factor 2 is changed accordingly (e.g., 3 for 3 layers etc.).

If used an LTE FD-MIMO system, one embodiment (e.g., estimated variables $\hat{l}, \hat{m}, \hat{n}$) are mapped to PMI indices specified in 3GPP TS 36.213 (Sec. 7.2), called $i_{11}$, $i_{12}$, $i_2$. The specific mapping depends on the number of layers and the configuration. In general mapping functions may be defined as in Equations (23), (24), and (25) for a single layer as follows:

$$i_{11} = f_{11}(l) \quad (23)$$

$$i_{12} = f_{12}(m) \quad (24)$$

$$i_2 = f_2(n, l, m) \quad (25)$$

Multiple layers with a JL approach is the same as for a single layer. However, multiple layers with a SL approach may use mapping functions as defined in Equations (26), (27), and (28) as follows:

$$i_{11} = f_{11}(l, l', \ldots) \quad (26)$$

$$i_{12} = f_{12}(m, m', \ldots) \quad (27)$$

$$i_2 = f_2(n, l, l', \ldots, m, m', \ldots) \quad (28)$$

where the dots indicate possible additional variables (e.g., l'', m'') in the case where the number of layers is more than 2.

In some cases (e.g., with LTE FD-MIMO reporting mode 3-2), part of the PMI report may be wideband (WB), while another part may be per-subband (SB). For example, in the case where l, m is wideband and n is per subband. $N_S$ may be defined as the total number of subcarriers (e.g., 100) and K as the number of subcarriers in one subband (e.g., 8 or 4 for edge subbands). The present disclosure may be modified in a number or ways as follows. SVD may be performed per-subcarrier (e.g., the output will be a set of eigenvectors $\{y_1\}_{i=0}^{N_S-1}$, one for each subcarrier). For wideband variables (e.g., l), all $N_S$ subcarriers may be combined in the LPE processors. For narrowband variables (e.g., n), K subcarriers per subband may be combined in the LPE processors. Consequently, there may be different $\hat{\theta}_n$, $\hat{\beta}_1$, $\hat{\beta}_2$ for different subbands, whereas $\hat{\theta}_l$, $\hat{\theta}_m$, $\hat{\beta}_0$ are unique for the entire band. MRC may be performed separately for each subcarrier. Consequently, the MRC outputs $\bar{y}_0$, $\bar{y}_1$, $\bar{y}_2$ may be different for different subcarriers. The final LPE processors may perform 2D-LPE, where multiple subcarriers may be combined (e.g., K subcarriers for variable n and $N_S$ subcarriers for the wideband variables). The hard decision processors may be per-subband for variable n and wideband for the other variables. FIG. 9 may be based on the semi-sequential embodiment illustrated in FIG. 5.

Referring to FIG. 9, an apparatus 900 includes an SVD processor 901, a first plurality of LPE processors 903 and 905, a plurality of angle vector processors 907, 909, and 911, a plurality of MRC processors 913, 915, and 917, a second plurality of LPE processors 919, 921, and 923, and a plurality of decision processors 925, 927, and 929. The SVD processor 901 and the MRC processors 913, 915, and 917 represent operations performed for each individual subcarrier; the LPE processors 903 and 919, the angle vector processors 909 and 911, and the decision processor 925 represent operations performed for each individual subband; while the LPE processors 905, 921, and 923, the angle vector processors 907, and the decision processors 927 and 929 represent wideband operations. However, the present disclosure is not limited thereto, and other WB/SB embodiments are possible. While FIG. 9 illustrates the SVD processor 901, the first plurality of LPE processors 903 and 905, the plurality of angle vector processors 907, 909, and 911, the plurality of MRC processors 913, 915, and 917, the second plurality of LPE processors 919, 921, and 923, and the plurality of decision processors 925, 927, and 929 as separate components, these processors may be included in one or more processors.

FIG. 9 illustrates the apparatus 900 where a codebook is formed by a Kronecker product of 3 DFT vectors (as in LTE FD-MIMO). The apparatus 900 may include 3 branches, one for each variable to be estimated (e.g., l, m, n). However, performance of ILPE may be improved while reducing complexity by estimating different variables sequentially. All (e.g., three) variables may be estimated in parallel at each stage, as illustrated in FIG. 2. However, once two variables are initially estimated (e.g., l and n), $\hat{\beta}_2$ may be computed, and m may be estimated by an MRC-based estimation of m. An MRC-based estimation of m is of better quality than an initial estimate of m as in FIG. 2. If the MRC-based estimation of m is used to compute $\hat{\beta}_0$ and $\hat{\beta}_1$, the quality of the estimations of l and n is improved. This is referred to as semi-sequential ILPE. The order of estimating the variable may be m first, then l, n. It is understood that there may be other orders, without deviating from the scope of the present disclosure.

According to one embodiment, the SVD processor 901 includes an input for receiving a channel matrix H, and an output for providing samples y of an optimal precoding matrix for H. The SVD processor 901 is illustrated as providing two samples (e.g., $y_0$ and $y_1$).

According to one embodiment, each of the first plurality of LPE processors 903 and 905 includes an input connected to the output of the SVD processor 901 for receiving one of the subvectors $y_0$ and $y_1$ partitioned from samples y of the optimal precoding matrix for H, and an output for providing an initial phase estimation of the corresponding subvectors $y_0$ and $y_1$. The LPE processors 903 and 905 compute initial estimates ($\hat{\theta}_l$, $\hat{\theta}_n$) of the angles $\theta_l$, $\theta_n$ (for example, by two-dimensional (2D) LPE). 2D LPE may be represented by the notation "$LPE_k[X,Y]$," where X represents the number of sample pairs per vector, Y is the number of vectors combined, and k is an integer indicating the branch. The apparatus 900 includes angles $$\theta_l \doteq \frac{2\pi}{O_1 N_1} l, \quad \theta_n \doteq \frac{\pi}{2} n,$$

that represent continuous counterparts of discrete variables l and n. Estimation of $\theta_l$ and $\theta_n$ is equivalent to estimating the variables l and n, up to a simple discretization as in Equation (2) above. An MRC-based estimation of m (e.g., $\hat{\theta}_m$) is made as described below.

According to one embodiment, each of the plurality of angle vector processors 907, 909, and 911, includes an input connected to a plurality of outputs of the first plurality of LPE processors 903 and 905 or an output of one of the second plurality of LPE processors 923 from which $\hat{\theta}_m$ is estimated, and an output for providing one of the angle vectors $\hat{\beta}_0, \hat{\beta}_1, \hat{\beta}_2$ computed from a plurality of the initial phase estimates $\hat{\theta}_l, \hat{\theta}_m, \hat{\theta}_n$. In the example illustrated in FIG. 9, the angle vector processor 907 is connected to the LPE processors 905 and 923, the angle vector processor 909 is connected to the LPE processors 903 and 923, and the angle vector processor 911 is connected to the LPE processors 903 and 905. However, the present disclosure is not limited thereto.

Each of the plurality of MRC processors 913, 915, and 917 includes a first input connected to one of the plurality of angle vector processors 907, 909, and 911, a second input connected to the output of the SVD processor 901, and an output for providing one of a combined vector $\bar{y}_0, \bar{y}_1,$ or $\bar{y}_2$ as expressed in Equations (3), (4), and (5) above.

Each of the second plurality of LPE processors 919, 921, and 923, includes an input connected to one of the plurality of MRC processors 913, 915, and 917, and an output for providing a re-estimate $\hat{\theta}_l, \hat{\theta}_m,$ or $\hat{\theta}_n$ of either one of the phases of the corresponding subvectors $y_0$ and $y_1$, or both $y_0$ and $y_1$ in the case of estimating $\hat{\theta}_m$, from one of the combined vectors $\bar{y}_0$ and $\bar{y}_1$, or $\bar{y}_2$ using LPE. The output of LPE processor 923 is connected to the inputs of LPE processors 907 and 909 for providing the MRC-based estimation of m (e.g., $\hat{\theta}_m$).

Each of the plurality of decision processors 925, 927, and 929 converts one of the re-estimated phases $\hat{\theta}_l$ or $\hat{\theta}_n$ and the MRC-based estimation of m (e.g., $\hat{\theta}_m$) into a hard estimate of one of ($\hat{l}, \hat{m}, \hat{n}$).

A single iteration is illustrated in FIG. 9. However, the present disclosure is not limited thereto. If there are multiple iterations, the estimates $\hat{\theta}_l, \hat{\theta}_m, \hat{\theta}_n$ before the plurality of decision processors 925, 927, and 929 are fed back as input to the plurality of angle vector processors 907, 909, and 911.

According to one embodiment, instead of using LPE with correlation distance 1, LPE with correlation distance D may be used whenever the number of samples in the input vector of LPE is at least D+1. For example, Equation (1) above may be modified as follows:

$$\hat{\theta}_{LPE} = \frac{1}{D} \angle \left( \sum_{i=0}^{N_1-1-D} y_i^* y_{i+D} \right) \quad (29)$$

Figure 10:
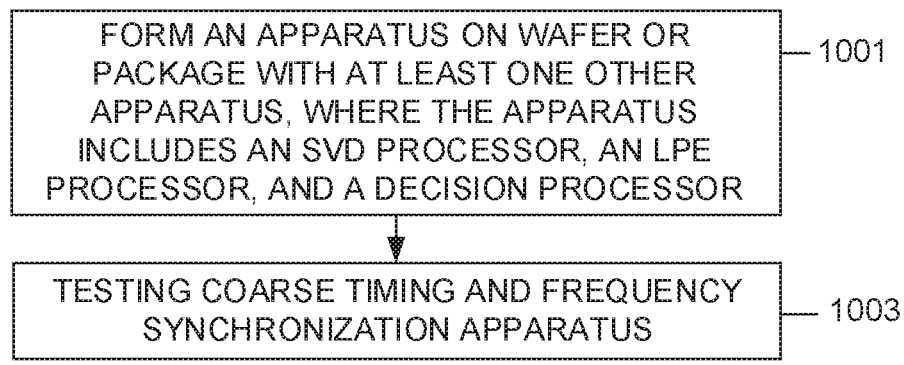
FIG. 10 illustrates an exemplary flowchart of a method of manufacturing a coarse timing and frequency synchronization apparatus, according to one embodiment.

FIG. 10 illustrates an exemplary flowchart of a method of manufacturing an apparatus, according to one embodiment.

Referring to FIG. 10, an apparatus is formed on a wafer or a package with at least one other apparatus, where the apparatus includes an SVD processor, an LPE processor, and a decision processor at 1001.

At 1003, the apparatus is tested. Testing the apparatus may include testing the apparatus using one or more electrical to optical converters, one or more optical splitters that split an optical signal into two or more optical signals, and one or more optical to electrical converters.

Figure 11:
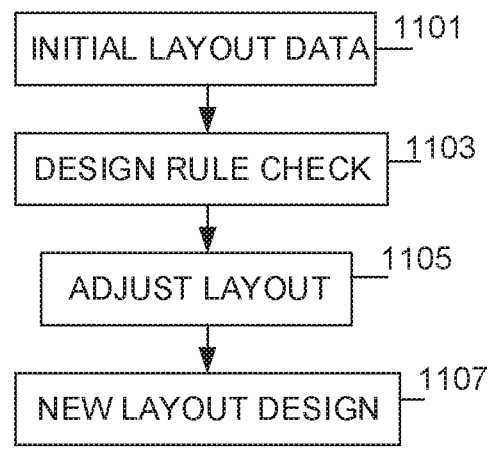
FIG. 11 illustrates an exemplary flowchart of a method of constructing an integrated circuit, according to one embodiment.

FIG. 11 illustrates an exemplary flowchart of a method of constructing an integrated circuit, according to one embodiment.

Referring to FIG. 11, initial layout data is constructed in 1101. For example, a mask layout is generated for a set of features for a layer of the integrated circuit, wherein the mask layout includes standard cell library macros for one or more circuit features that include An apparatus that includes an SVD processor, an LPE processor, and a decision processor, and disregarding relative positions of the macros for compliance to layout design rules during the generation of the mask layout.

At 1103, a design rule check is performed. For example, the method may check the relative positions of the macros for compliance to layout design rules after generating the mask layout.

At 1105, the layout is adjusted. For example, the method, upon detection of noncompliance with the layout design rules by any of the macros, may modify the mask layout by modifying each of the noncompliant macros to comply with the layout design rules.

At 1107, new layout data is generated. For example, the method may generate a mask according to the modified mask layout with the set of features for the layer of the integrated circuit. Then, the integrated circuit layer according to the mask may be manufactured.

Figure 12:
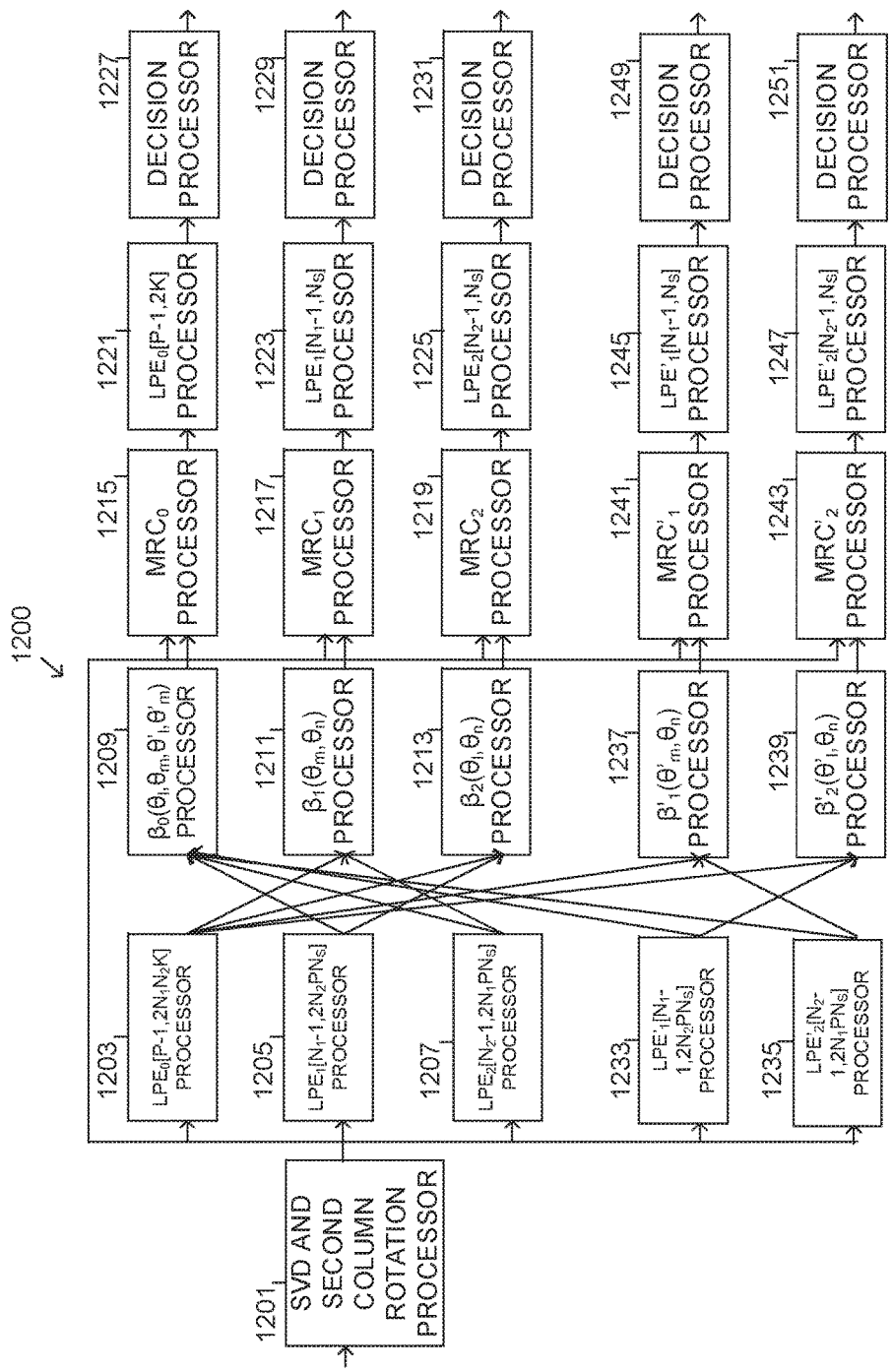
FIG. 12 illustrates an exemplary block diagram of an apparatus for a parallel version of a Kronecker DFT codebook with multiple and separate layers, according to one embodiment.

FIG. 12 illustrates an exemplary block diagram of an apparatus for a parallel version of a Kronecker DFT codebook with multiple and separate layers, according to one embodiment.

Referring to FIG. 12, an apparatus 1200 includes an SVD and second column rotation processor 1201, a first layer, and a second layer.

FIG. 12 illustrates the apparatus 1200 where a codebook is formed by a Kronecker product of 3 DFT vectors (as in LTE FD-MIMO). The apparatus 1200 may include 3 branches, one for each variable to be estimated (e.g., l, m, n). All (e.g., three) variables are estimated in parallel at each stage, as illustrated in FIG. 2.

According to one embodiment, the SVD and second column rotation processor 1201 includes an input for receiving a channel matrix H, and an output for providing samples y of an optimal precoding matrix for H. The SVD and second column rotation processor 1201 is illustrated as providing two subvectors of samples (e.g., $y_0$ and $y_1$). The SVD and second column rotation processor 1201 rotates a second column as described above.

The first layer includes a first plurality of LPE processors 1203, 1205, and 1207, a first plurality of angle vector processors 1209, 1211, and 1213, a first plurality of MRC processors 1215, 1217, and 1219, a second plurality of LPE processors 1221, 1223, and 1225, and a first plurality of decision processors 1227, 1229, and 1231.

According to one embodiment, each of the first plurality of LPE processors 1203, 1205, and 1207 includes an input connected to the output of the SVD and second column rotation processor 1201 for receiving one of the subvectors $y_0, y_1,$ and $y_2$ partitioned from samples y of the optimal precoding matrix for H, and an output for providing an initial phase estimation of the corresponding subvectors $y_0, y_1,$ and $y_2$. The LPE processors 1203, 1205, and 1207 compute initial estimates ($\hat{\theta}_l, \hat{\theta}_m, \hat{\theta}_n$) of the angles $\hat{\theta}_l, \hat{\theta}_m, \hat{\theta}_n$, (for example, by two-dimensional (2D) LPE). 2D LPE may be represented by the notation "$LPE_k[X,Y]$," where X represents the number of sample pairs per vector, Y is the number of vectors combined, and k is an integer indicating the branch. The apparatus 1200 includes angles $$\theta_l \triangleq \frac{2\pi}{O_1 N_1} l, \theta_m \triangleq \frac{2\pi}{O_2 N_2} m, \theta_n \triangleq \frac{\pi}{2} n,$$

that represent continuous counterparts of discrete variables l, m, and n. Estimation of $\theta_l$, $\theta_m$, and $\theta_n$ is equivalent to estimating the variables m, l, and n, up to a simple discretization as in Equation (2) above.

According to one embodiment, each of the first plurality of angle vector processors 1209, 1211, and 1213, includes an input connected to a plurality of outputs of the first plurality of LPE processors 1203, 1205, and 1207, and an output for providing one of the angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$. The angle vector processor 1209 is also connected to the LPE processors 1233 and 1235 in the third plurality of LPE processors in the second layer. In the example illustrated in FIG. 12, the angle vector processor 1209 is connected to the LPE processors 1205 and 1207, the angle vector processor 1211 is connected to the LPE processors 1203 and 1207, and the angle vector processor 1213 is connected to the LPE processors 1203 and 1205. However, the present disclosure is not limited thereto.

Each of the first plurality of MRC processors 1215, 1217, and 1219 includes a first input connected to one of the plurality of angle vector processors 1209, 1211, and 1213, a second input connected to the output of the SVD and second column rotation processor 1201, and an output for providing one of a combined vector $\bar{y}_0$, $\bar{y}_1$, or $\bar{y}_2$ as expressed in Equations (3), (4), and (5) above.

Each of the second plurality of LPE processors 1221, 1223, and 1225, includes an input connected to one of the plurality of MRC processors 1215, 1217, and 1219, and an output for providing a re-estimate $\hat{\theta}_l$, $\hat{\theta}_m$, or $\hat{\theta}_n$ of either one of the phases of the corresponding subvectors $y_0$, $y_1$, and $y_2$.

Each of the first plurality of decision processors 1227, 1229, and 1231 converts one of the re-estimated phases $\hat{\theta}_l$, $\hat{\theta}_m$, or $\hat{\theta}_n$ into a hard estimate of one of $(\hat{l}, \hat{m}, \hat{n})$.

A single iteration is illustrated in FIG. 12. However, the present disclosure is not limited thereto. If there are multiple iterations, the estimates $\hat{\theta}_l$, $\hat{\theta}_m$, $\hat{\theta}_n$ before the first plurality of decision processors 1227, 1229, and 1231 are fed back as input to the first plurality of angle vector processors 1209, 1211, and 1213.

The second layer includes a third plurality of LPE processors 1233 and 1235, a second plurality of angle vector processors 1237 and 1239, a second plurality of MRC processors 1241 and 1243, a fourth plurality of LPE processors 1245 and 1247, and a second plurality of decision processors 1249 and 1251.

According to one embodiment, each of the third plurality of LPE processors 1233 and 1235 includes an input connected to the output of the SVD and second column rotation processor 1201 for receiving one of the subvectors $y_1$ and $y_2$ partitioned from samples y of the optimal precoding matrix for H, and an output for providing an initial phase estimation of the corresponding subvectors $y_1$ and $y_2$. Each of the third plurality of LPE processors 1233 and 1235 computes an initial estimate $(\hat{\theta}_l, \hat{\theta}_m)$ of the angles $\theta_l$ and $\theta_m$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch.

According to one embodiment, each of the second plurality of angle vector processors 1237 and 1239, includes an input connected to one of the outputs of the first plurality of LPE processors 1203, 1205, and 1207 and an output of one of the third plurality of LPE processor 1233 and 1235, and an output for providing one of the angle vectors $\hat{\beta}_2'$, $\hat{\beta}_2'$ computed from a plurality of the initial phase estimates $\hat{\theta}_n$, $\hat{\theta}_m'$, $\hat{\theta}_l'$. In the example illustrated in FIG. 12, the angle vector processor 1237 is connected to the LPE processors 1203 and 1235, and the angle vector processor 1239 is connected to the LPE processors 1203 and 1233. However, the present disclosure is not limited thereto.

Each of the second plurality of MRC processors 1241 and 1243 includes a first input connected to one of the second plurality of angle vector processors 1237 and 1239, a second input connected to the output of the SVD and second column rotation processor 1201, and an output for providing one of a combined vector $\bar{y}_1'$, or $\bar{y}_2'$, which is expressed similarly to Equations (3) and (4) above.

Each of the second plurality of decision processors 1249 and 1251 converts one of the re-estimated phases $\hat{\theta}_l'$ or $\hat{\theta}_m'$ into a hard estimate of one of $(\hat{l}', \hat{m}')$.

A single iteration is illustrated in FIG. 12. However, the present disclosure is not limited thereto. If there are multiple iterations, the estimates $\hat{\theta}_l'$ and $\hat{\theta}_m'$ before the second plurality of decision processors 1249 and 1251 are fed back as input to the second plurality of angle vector processors 1237 and 1239.

While FIG. 12 illustrates the various processors as separate components, they may be included in one or more processors.

Figure 13:
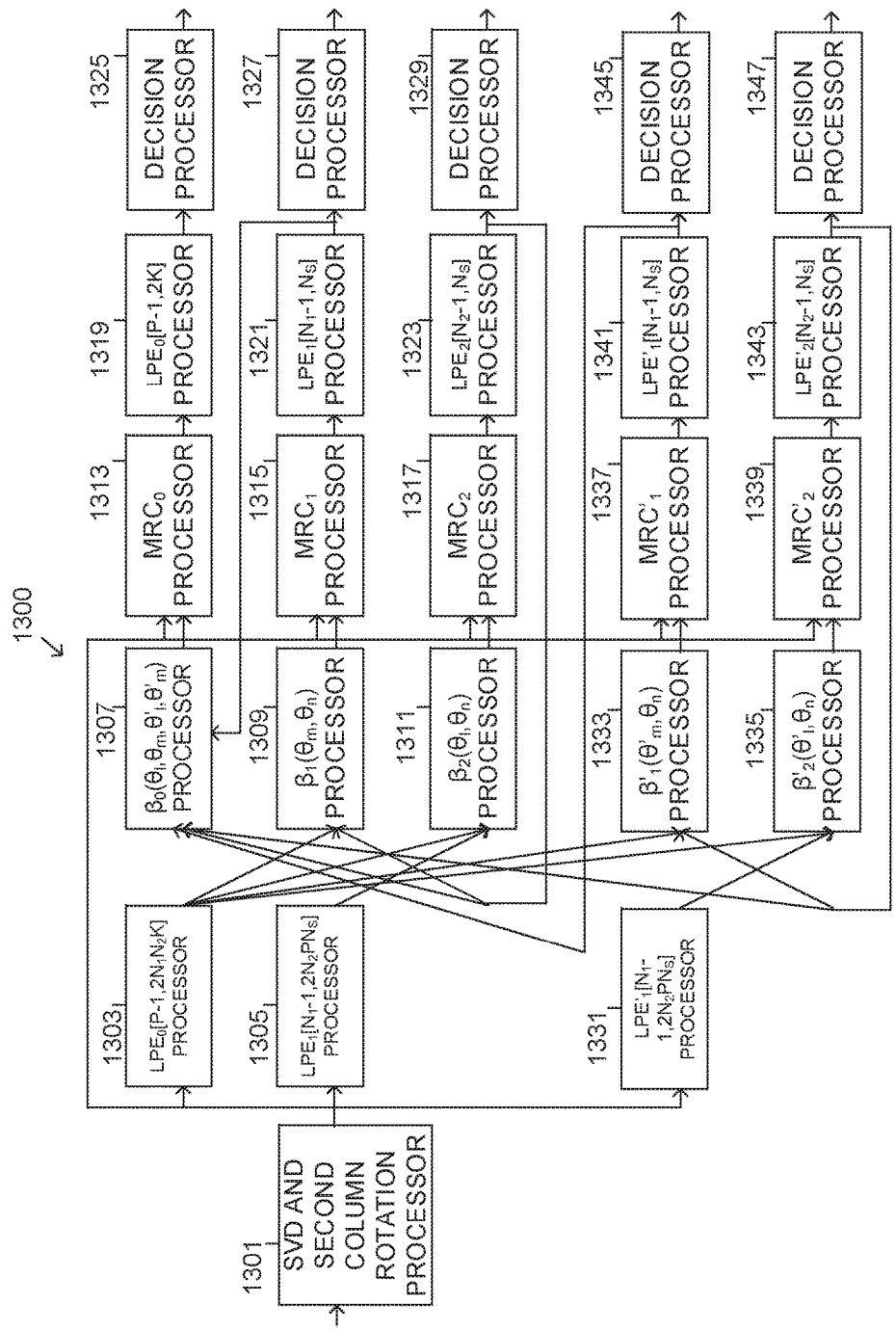
FIG. 13 illustrates an exemplary block diagram of an apparatus for sequential ILPE with multiple and separate layers, according to one embodiment.

FIG. 13 illustrates an exemplary block diagram of an apparatus for sequential ILPE with multiple and separate layers, according to one embodiment.

Referring to FIG. 13, an apparatus 1300 includes an SVD and second column rotation processor 1301, a first layer, and a second layer.

FIG. 13 illustrates the apparatus 1300 where a codebook is formed by a Kronecker product of 3 DFT vectors (as in LTE FD-MIMO). The apparatus 1300 may include 3 branches, one for each variable to be estimated (e.g., l, m, n). However, performance of ILPE may be improved while reducing complexity by estimating different variables sequentially. All (e.g., three) variables may be estimated in parallel at each stage, as illustrated in FIG. 2. However, once two variables are initially estimated (e.g., l and n), $\hat{\beta}_2$, $\hat{\beta}_1'$, and $\hat{\beta}_2'$ may be computed, and m, m', and l' may be estimated by MRC-based estimations of m, m', and l'. MRC-based estimation of m, m', and l' are of better quality than initial estimates of m, m', and l' as in FIG. 2. If the MRC-based estimations of m, m', and l' are used to compute $\hat{\beta}_0$, $\hat{\beta}_1'$, and $\hat{\beta}_2'$, the quality of the estimations of l and n is improved. This is referred to as semi-sequential ILPE in separate layers. The order of estimating the variables may be m first, then l, n. It is understood that there may be other orders, without deviating from the scope of the present disclosure.

According to one embodiment, the SVD and second column rotation processor 1301 includes an input for receiving a channel matrix H, and an output for providing samples y of an optimal precoding matrix for H. The SVD and second column rotation processor 1301 is illustrated as providing two subvectors of samples (e.g., $y_0$ and $y_1$). The SVD and second column rotation processor 1301 rotates a second column as described above.

The first layer includes a first plurality of LPE processors 1303 and 1305, a first plurality of angle vector processors 1307, 1309, and 1311, a first plurality of MRC processors 1313, 1315, and 1317, a second plurality of LPE processors 1319, 1321, and 1323, and a first plurality of decision processors 1325, 1327, and 1329.

According to one embodiment, each of the first plurality of LPE processors 1303 and 1305 includes an input connected to the output of the SVD and second column rotation processor 1301 for receiving one of the subvectors $y_0$ and $y_1$ partitioned from samples y of the optimal precoding matrix for H, and an output for providing an initial phase estimation of the corresponding subvectors $y_0$ and $y_1$. The LPE processors 1303 and 1305 compute initial estimates ($\hat{\theta}_l$, $\hat{\theta}_n$) of the angles $\theta_l$, $\theta_n$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch. The apparatus 1300 includes angles $$\theta_l \doteq \frac{2\pi}{O_1 N_1} l, \theta_n \doteq \frac{\pi}{2} n,$$

that represent continuous counterparts of discrete variables l and n. Estimation of $\theta_l$ and $\theta_n$ is equivalent to estimating the variables l and n, up to a simple discretization as in Equation (2) above. An MRC-based estimation of m (e.g., $\hat{\theta}_m$) is made as described below.

According to one embodiment, each of the first plurality of angle vector processors 1307, 1309, and 1311, includes an input connected to at least one output of LPE processors 1303, 1305, or an output of one of the LPE processors 1323, 1341, or 1343 from which $\hat{\theta}_m$, $\hat{\theta}_l'$, and $\hat{\theta}_m'$, are estimated, and an output for providing one of the angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$, $\hat{\theta}_l'$, and $\hat{\theta}_m'$. In the example illustrated in FIG. 13, the angle vector processor 1307 is connected to the LPE processors 1323, 1341, and 1343, the angle vector processor 1309 is connected to the LPE processors 1303 and 1323, and the angle vector processor 1311 is connected to the LPE processors 1303 and 1305. However, the present disclosure is not limited thereto.

Each of the first plurality of MRC processors 1313, 1315, and 1317 includes a first input connected to one of the plurality of angle vector processors 1307, 1309, and 1311, a second input connected to the output of the SVD and second column rotation processor 1301, and an output for providing one of a combined vector $\bar{y}_0$, $\bar{y}_1$, or $\bar{y}_2$ as expressed in Equations (3), (4), and (5) above.

Each of the second plurality of LPE processors 1319, 1321, and 1323, includes an input connected to one of the plurality of MRC processors 1313, 1315, and 1317, and an output for providing a re-estimate $\hat{\theta}_l$, $\hat{\theta}_m$, or $\hat{\theta}_n$ of either one of the phases of the corresponding subvectors $y_0$ and $y_1$, or both $y_0$ and $y_1$ in the case of estimating $\hat{\theta}_m$, from one of the combined vectors $\bar{y}_0$ and $\bar{y}_1$, or $\bar{y}_2$ using LPE. The output of the LPE processor 1323 is connected to the inputs of the angle vector processors 1307 and 1309 for providing the MRC-based estimation of m (e.g., $\hat{\theta}_m$).

Each of the first plurality of decision processors 1325, 1327, and 1329 converts one of the re-estimated phases $\hat{\theta}_l$ or $\hat{\theta}_n$ and the MRC-based estimation of m (e.g., $\hat{\theta}_m$), m' (e.g., $\hat{\theta}'_m$), and l' (e.g., $\hat{\theta}'_l$) into a hard estimate of one of ($\hat{l},\hat{m},\hat{n}$).

A single iteration is illustrated in FIG. 13. However, the present disclosure is not limited thereto. If there are multiple iterations, the estimates $\hat{\theta}_l$, $\hat{\theta}_m$, $\hat{\theta}_n$, $\hat{\theta}'_m$, and $\hat{\theta}'_l$ before the first plurality of decision processors 1325, 1327, and 1329 are fed back as input to the first plurality of angle vector processors 1307, 1309, and 1311.

The second layer includes an LPE processor 1331, a second plurality of angle vector processors 1333 and 1335, a second plurality of MRC processors 1337 and 1339, a third plurality of LPE processors 1341 and 1343, and a second plurality of decision processors 1345 and 1347.

According to one embodiment, the LPE processor 1331 includes an input connected to the output of the SVD and second column rotation processor 1301 for receiving one of the subvectors $y_0$ and $y_1$ partitioned from samples y of the optimal precoding matrix for H, and an output for providing an initial phase estimation of the corresponding subvectors $y_0$ and $y_1$. The LPE processor 1331 computes an initial estimate ($\hat{\theta}_l$) of the angle $\theta_l$ (for example, by two-dimensional (2D) LPE). 2D LPE may be represented by the notation "LPE$_k$[X,Y]," where X represents the number of sample pairs per vector, Y is the number of vectors combined, and k is an integer indicating the branch. An MRC-based estimation of m' (e.g., $\hat{\theta}_{m'}$) is made as described below.

According to one embodiment, each of the plurality of angle vector processors 1333 and 1335, includes an input connected to an output of one of the first plurality of LPE processors 1303 and 1305 and either an output of the LPE processor 1331 or an output of one of the second plurality of LPE processors 1343 from which $\hat{\theta}_{m'}$ is estimated, and an output for providing one of the angle vectors $\hat{\beta}_2'$, $\hat{\beta}_2'$ computed from a plurality of the initial phase estimates $\theta_n$, $\hat{\theta}_{m'}$, $\hat{\theta}_{l'}$. In the example illustrated in FIG. 13, the angle vector processor 1333 is connected to the LPE processors 1303 and 1343, and the angle vector processor 1335 is connected to the LPE processors 1303 and 1331. However, the present disclosure is not limited thereto.

Each of the plurality of MRC processors 1337 and 1339 includes a first input connected to one of the plurality of angle vector processors 1333 and 1335, a second input connected to the output of the SVD and second column rotation processor 1301, and an output for providing one of a combined vector $\bar{y}_1'$, or $\bar{y}_2'$, which is expressed similarly to Equations (3) and (4) above.

Each of the third plurality of LPE processors 1341 and 1343, includes an input connected to one of the plurality of MRC processors 1337 and 1339, and an output for providing a re-estimate $\hat{\theta}_l'$ or $\hat{\theta}_m'$ of either one of the phases of the corresponding subvectors $\bar{y}_1'$, or $\bar{y}_2'$ in the case of estimating $\hat{\theta}_{m'}$, from one of the combined vectors $\bar{y}_1$, or $\bar{y}_2$ using LPE. The output of the LPE processor 1341 is connected to the inputs of the angle vector processor 1307. The output of the LPE processor 1343 is connected to the input of the angle vector processors 1307 and 1333 for providing the MRC-based estimation of m' (e.g., $\hat{\theta}_{m'}$).

Each of the second plurality of decision processors 1345 and 1347 converts one of the re-estimated phases $\hat{\theta}_l'$ or $\hat{\theta}_m'$ and the MRC-based estimation of m' (e.g., $\hat{\theta}_{m'}$) into a hard estimate of one of ($\hat{l}',\hat{m}'$).

A single iteration is illustrated in FIG. 13. However, the present disclosure is not limited thereto. If there are multiple iterations, the estimates $\hat{\theta}_l'$ and $\hat{\theta}_m'$ before the second plurality of decision processors 1345 and 1347 are fed back as input to the second plurality of angle vector processors 1333 and 1335.

While FIG. 13 illustrates the various processors as separate components, they may be included in one or more processors.

Figure 14:
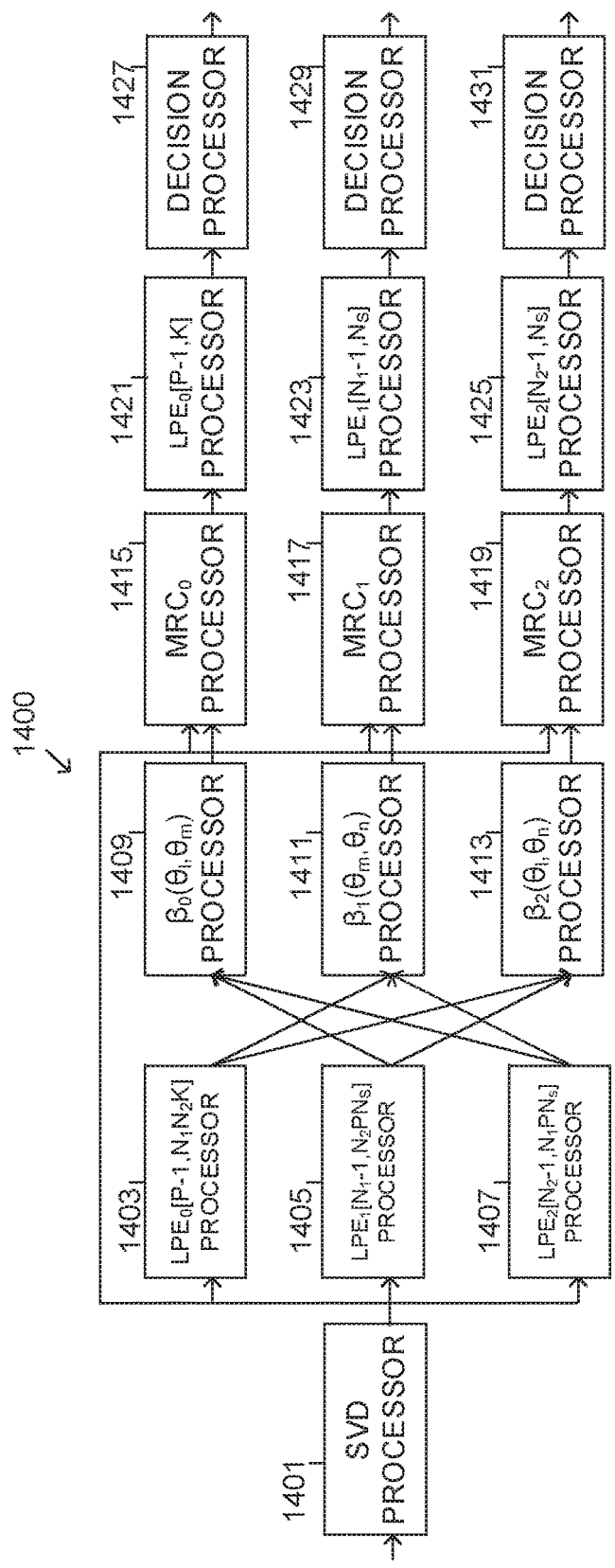
FIG. 14 illustrates an exemplary block diagram of an apparatus for a parallel version of a wideband/subband single layer Kronecker DFT codebook, according to one embodiment.

In some cases (e.g., with LTE FD-MIMO reporting mode 3-2), part of the PMI report may be wideband (WB), while another part may be per-subband (SB). For example, in the case where l, m is wideband and n is per subband. $N_S$ may be defined as the total number of subcarriers (e.g., 100) and K as the number of subcarriers in one subband (e.g., 8 or 4 for edge subbands). The present disclosure may be modified in a number or ways as follows. SVD may be performed per-subcarrier (e.g., the output will be a set of eigenvectors $\{y_1\}_{i=0}^{N_S-1}$, one for each subcarrier). For wideband variables (e.g., l), all $N_S$ subcarriers may be combined in the LPE processors. For narrowband variables (e.g., n), K subcarriers per subband may be combined in the LPE processors. Consequently, there may be different $\hat{\theta}_n$, $\hat{\beta}_1$, $\hat{\beta}_2$ for different subbands, whereas $\hat{\theta}_l$, $\hat{\theta}_m$, $\hat{\beta}_0$ are unique for the entire band. MRC may be performed separately for each subcarrier. Consequently, the MRC outputs $\bar{y}_0$, $\bar{y}_1$, $\bar{y}_2$ may be different for different subcarriers. The final LPE processors may perform 2D-LPE, where multiple subcarriers may be combined (e.g., K subcarriers for variable n and $N_S$ subcarriers for the wideband variables). The hard decision processors may be per-subband for variable n and wideband for the other variables. FIG. 14 may be based on the parallel version of a single layer Kronecker DFT codebook embodiment illustrated in FIG. 2.

FIG. 14 illustrates an exemplary block diagram of an apparatus for a parallel version of a wideband/subband single layer Kronecker DFT codebook, according to one embodiment.

Referring to FIG. 14, an apparatus 1400 includes an SVD processor 1401, a first plurality of LPE processors 1403, 1405, and 1407, a plurality of angle vector processors 1409, 1411, and 1413, a plurality of MRC processors 1415, 1417, and 1419, a second plurality of LPE processors 1421, 1423, and 1425, and a plurality of decision processors 1427, 1429, and 1431. The SVD processor 1401 and the MRC processors 1415, 1417, and 1419 represent operations performed for each individual subcarrier; the LPE processors 1403 and 1421, the angle vector processors 1411 and 1413, and the decision processor 1427 represent operations performed for each individual subband); the LPE processors 1405, 1407, 1423, and 1425, the angle vector processors 1409, and the decision processors 1429 and 1431 represent wideband operations. However, the present disclosure is not limited thereto, and other WB/SB embodiments are possible. While FIG. 14 illustrates the SVD processor 1401, the first plurality of LPE processors 1403, 1405, and 1407, the plurality of angle vector processors 1409, 1411, and 1413, the plurality of MRC processors 1415, 1417, and 1419, the second plurality of LPE processors 1421, 1423, and 1425, and the plurality of decision processors 1427, 1429, and 1431 as separate components, these processors may be included in one or more processors.

FIG. 14 illustrates the apparatus 1400 where a codebook is formed by a Kronecker product of 3 DFT vectors (as in LTE FD-MIMO), hence the apparatus 1400 includes 3 branches, one for each variable to be estimated (e.g., l, m, n). However, the present disclosure is not limited thereto and may be extended to different numbers of DFT vectors, without deviating from the scope of the present disclosure.

According to one embodiment, the SVD processor 1401 includes an input for receiving a channel matrix H, and an output for providing samples y of an optimal precoding matrix for H. The SVD processor 1401 is illustrated as providing three subvectors of samples (e.g., $y_0$, $y_1$, and $y_2$).

According to one embodiment, each of the first plurality of LPE processors 1403, 1405, and 1407 includes an input connected to the output of the SVD processor 1401 for receiving one of the subvectors $y_0$, $y_1$, and $y_2$ partitioned from samples y of the optimal precoding matrix for H, and an output for providing an initial phase estimation of the corresponding subvectors $y_0$, $y_1$, and $y_2$. The LPE processors 1403, 1405, and 1407 compute initial estimates $(\hat{\theta}_l, \hat{\theta}_m, \hat{\theta}_n)$ of the angles $\theta_l$, $\theta_m$, $\theta_n$ (for example, by two- dimensional (2D) LPE). 2D LPE may be represented by the notation "$LPE_k[X,Y]$," where X represents the number of sample pairs per vector, Y is the number of vectors combined, and k is an integer indicating the branch. The apparatus 1400 includes angles $$\theta_l \doteq \frac{2\pi}{O_1 N_1} l, \theta_m \doteq \frac{2\pi}{O_2 N_2} m, \theta_n \doteq \frac{\pi}{2} n,$$

that represent continuous counterparts of discrete variables l, m, and n. Estimation of $\theta_l$, $\theta_m$, and $\theta_n$ is equivalent to estimating the variables m, l, and n, up to a simple discretization as in Equation (2) above.

According to one embodiment, each of the plurality of angle vector processors 1409, 1411, and 1413, includes an input connected to a plurality of outputs of the first plurality of LPE processors 1403, 1405, and 1407, and an output for providing one of angle vectors $\hat{\beta}_0$, $\hat{\beta}_1$, $\hat{\beta}_2$ computed from a plurality of the initial phase estimates $\hat{\theta}_l$, $\hat{\theta}_m$, $\hat{\theta}_n$. In the example illustrated in FIG. 14, the angle vector processor 1409 is connected to the LPE processors 1405 and 1407, the angle vector processor 1411 is connected to the LPE processors 1403 and 1407, and the angle vector processor 1413 is connected to the LPE processors 1403 and 1405. However, the present disclosure is not limited thereto.

Each of the plurality of MRC processors 1415, 1417, and 1419 includes an input connected to one of the plurality of angle vector processors 1409, 1411, and 1413, an input connected to the SVD processor 1401, and an output for providing one of a combined vector $\bar{y}_0$, $\bar{y}_1$, or $\bar{y}_2$ as expressed in Equations (3), (4), and (5) above.

Each of the second plurality of LPE processors 1421, 1423, and 1425, includes an input connected to one of the plurality of MRC processors 1415, 1417, and 1419, and an output for providing a re-estimate $\hat{\theta}_0$, $\hat{\theta}_m$, or $\hat{\theta}_n$ of one of the phases of the corresponding subvectors $y_0$, $y_1$, and $y_2$ from one of the combined vectors $\bar{y}_0$, $\bar{y}_1$, or $\bar{y}_2$ using one-dimensional (1D) LPE. 1D LPE may be represented by the notation "$LPE_k[X]$," where X represents the number of sample pairs per vector, and k is an integer indicating the branch.

Each of the plurality of decision processors 1427, 1429, and 1431 converts one of the re-estimated phases $\hat{\theta}_l$, $\hat{\theta}_m$, $\hat{\theta}_n$ into a hard estimate of one of $(\hat{l}, \hat{m}, \hat{n})$.

A single iteration is illustrated in FIG. 14. However, the present disclosure is not limited thereto. If there are multiple iterations, the estimates $\hat{\theta}_l$, $\hat{\theta}_m$, $\hat{\theta}_n$ before the plurality of decision processors 1427, 1429, and 1431 are fed back as input to the plurality of angle vector processors 1409, 1411, and 1413.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:
1. An apparatus, comprising:
a singular value decomposition (SVD) processor configured to receive a channel matrix H and output samples y of an optimal precoding matrix for H;

a linear phase estimation (LPE) processor connected to the SVD processor and configured to determine a phase estimate $\hat{\theta}_l$ of an angle $\theta_l$ of a horizontal discrete Fourier transform (DFT) index l, where l is an integer; and a decision processor connected to the LPE processor and configured to determine a hard estimate of l.

2. The apparatus of claim 1, wherein the LPE processor is further configured to determine an estimate $\hat{\theta}_l$ as follows:

$$\hat{\theta}_{LPE} = \angle(\Sigma_{i=0}^{N_1-2} y_i^* y_{i+1})$$

wherein $N_1$ is a size of a DFT vector, $y_1$ and $y_{1+i}$ are consecutive samples of the optimal precoding matrix for H, and "*" indicates complex conjugation.

3. The apparatus of claim 1, wherein the decision processor is further configured to determine the hard estimate of l as follows:

$$\hat{l}_{LPE} = \text{round}\left(\frac{O_1 N_1}{2\pi}\hat{\theta}_{LPE}\right) \bmod(O_1 N_1),$$

wherein round is a function for rounding to a nearest integer, $O_1$ is an oversampling factor, and $N_1$ is a size of a DFT vector.

4. An apparatus, comprising:
a singular value decomposition (SVD) processor configured to receive a channel matrix H and output samples y of an optimal precoding matrix for H;
a first plurality of linear phase estimation (LPE) processors connected to the SVD processor and configured to determine phase estimates $\hat{\theta}_l$, $\hat{\theta}_m$, and $\hat{\theta}_n$ of an angle $\theta_l$ of a horizontal discrete Fourier transform (DFT) index l, an angle $\theta_m$ of a vertical discrete DFT index m, and a co-phasing $\theta_n$ of cross-polarized antennas of a co-phasing index n, respectively, where l, m, and n are integers;
a plurality of angle vector processors connected to the first plurality of LPE processors, respectively, and configured to determine angle vectors $\hat{\beta}_0$, $\hat{\beta}_1$, $\hat{\beta}_2$ computed from the phase estimates $\hat{\theta}_l$, $\hat{\theta}_m$, $\hat{\theta}_n$;
a plurality of maximal ratio combining (MRC) processors connected to the SVD processor and to the plurality of angle vector processors, respectively, and configured to generate combined vectors $\bar{y}_0$, $\hat{y}_1$, and $\bar{y}_2$, respectively;
a second plurality of LPE processors connected to the plurality MRC processors, respectively, and configured to re-estimate $\hat{\theta}_l$, $\hat{\theta}_m$, and $\hat{\theta}_n$, respectively; and
a plurality of decision processors connected to the second plurality of LPE processors, respectively, and each configured to determine a hard estimate of l, m, and n, respectively.

5. The apparatus of claim 4, wherein the SVD processor is comprised of an SVD and a second column rotation processor and further comprising:
a third plurality of LPE processors connected to the SVD and second column rotation processor and one of the plurality of angle vector processors, and configured to determine a phase estimate $\hat{\theta}_{l'}$ of an angle $\theta_{l'}$ of a horizontal DFT index l';
a second plurality of angle vector processors connected to one of the first plurality of LPE processor and the third plurality of LPE processors, respectively, and configured to determine angle vectors $\hat{\beta}'_0$, $\hat{\beta}'_1$, $\hat{\beta}'_2$ computed from the phase estimates $\hat{\theta}_{l'}$ and $\hat{\theta}_{m'}$;
a second plurality of MRC processors connected to the second plurality of angle vector processors and the SVD and second column rotation processor, respectively, and configured to generate combined vectors $\bar{y}'_1$ and $\bar{y}'_2$, respectively;
a fourth plurality of LPE processors connected to the second plurality of MRC processors, respectively, and configured to re-estimate $\hat{\theta}_{l'}$ and $\hat{\theta}_{m'}$, respectively; and
a second plurality of decision processors connected to the fourth plurality of LPE processors, respectively, and each configured to determine a hard estimate of l' and m', respectively.

6. The apparatus of claim 4, wherein the SVD processor and the plurality of MRC processors are further configured to perform operations for each individual subcarrier;
each of the first plurality of LPE processors, the second plurality of LPE processors, the plurality of angle vector processors, and the plurality of decision processors is configured to perform one of a wideband operation and a sideband operation.

7. The apparatus of claim 4, wherein the first and second plurality of LPE processors are further configured to determine the estimates $\hat{\theta}_l$, $\hat{\theta}_m$, and $\hat{\theta}_n$ as follows:

$$\hat{\theta}_l = \angle(\Sigma_{i=0}^{N_2 P-1}\Sigma_{k=0}^{N_1-2} y_{1,i,k}^* y_{1,i,k+1}),$$

$$\hat{\theta}_m = \angle(\Sigma_{i=0}^{N_1 P-1}\Sigma_{k=0}^{N_2-2} y_{2,i,k}^* y_{2,i,k+1}),$$

$$\hat{\theta}_n = \angle(\Sigma_{i=0}^{N_1 N_2-1}\Sigma_{k=0}^{P-2} y_{0,i,k}^* y_{0,i,k+1}),$$

wherein $N_1$, $N_2$, and P are sizes of DFT vectors, $y_{j,i,k}$ and $y_{j,i,k+1}$ for j=0, 1, or 2, are consecutive samples of the optimal precoding matrix for H, and "*" indicates complex conjugation.

8. The apparatus of claim 4, wherein the plurality of angle vector processors are further configured to determine the angle vectors $\hat{\beta}_0$, $\hat{\beta}_1$, $\hat{\beta}_2$, respectively, as follows:

$$\beta_0 = [0 \ldots (N_2-1)\theta_m \ldots (N_1-1)\theta_l \ldots (N_1-1)\theta_l + (N_2-1)\theta_m]^T,$$

$$\beta_1 = [0, \theta_m \ldots (N_2-1)\theta_m, \theta_n, \theta_n + \theta_m \ldots \theta_n + (N_2-1)\theta_m]^T,$$

$$\beta_2 = [0, \theta_l \ldots (N_1-1)\theta_l, \theta_n, \theta_n + \theta_l \ldots \theta_n + (N_1-1)\theta_l]^T,$$

wherein $N_1$ and $N_2$ are sizes of DFT vectors, and T is a transpose function, wherein the plurality of MRC processors are further configured to generate the combined vectors $\bar{y}_0$, $\bar{y}_1$, and $\bar{y}_2$, respectively, as follows:

$$\bar{y}_1 = \frac{1}{N_2 P}\sum_{i=0}^{N_2 P-1} y_{1,i} e^{-j\beta_{1,i}}$$

$$\bar{y}_2 = \frac{1}{N_1 P}\sum_{i=0}^{N_1 P-1} y_{2,i} e^{-j\beta_{2,i}}$$

$$\bar{y}_0 = \frac{1}{N_1 N_2}\sum_{i=0}^{N_1 N_2-1} y_{0,i} e^{-j\beta_{0,i}}$$

wherein $N_1$, $N_2$, and P are sizes of DFT vectors, and $y_0$, $y_1$, and $y_2$ are samples of the optimal precoding matrix for H, wherein the plurality of decision processors are further configured to determine hard estimates of l, m, and n as follows:

$$\hat{l} = \text{round}\left(\frac{O_1 N_1}{2\pi}\hat{\theta}_l\right)\bmod(O_1 N_1),$$

-continued $$\hat{m} = \text{round}\left(\frac{O_2 N_2}{2\pi}\hat{\theta}_m\right) \text{mod}(O_2 N_2),$$

$$\hat{n} = \text{round}\left(\frac{2}{\pi}\hat{\theta}_n\right) \text{mod} 4,$$

and wherein round is a function for rounding to a nearest integer, $O_1$ and $O_2$ are oversampling factors, and $N_1$ and $N_2$ are sizes of DFT vectors.

9. A method, comprising:
partitioning, by a singular value decomposition (SVD) processor, samples y of an optimal precoding matrix for a channel matrix H into subvectors for each of variables l, m, and n where l, m and n are integers;
computing, by a first plurality of linear phase estimation (LPE) processors, initial estimates $\hat{\theta}_l$, $\hat{\theta}_m$, $\hat{\theta}_n$ of angles $\theta_l$, $\theta_m$, $\theta_n$;
computing, by a plurality of angle vector processors, angle vectors $\hat{\beta}_0$, $\hat{\beta}_1$, $\hat{\beta}_2$ from the initial estimates of $\hat{\theta}_l$, $\hat{\theta}_m$, $\hat{\theta}_n$;
applying maximal ratio combining (MRC), by a plurality of MRC processors, to the angle vectors $\hat{\beta}_0$, $\hat{\beta}_1$, $\hat{\beta}_2$ to obtain combined vectors $\bar{y}_0$, $\bar{y}_1$, $\bar{y}_2$;
re-estimating $\hat{\theta}_l$, $\hat{\theta}_m$, and $\hat{\theta}_n$ by a second plurality of LPE processors;
if the re-estimates $\hat{\theta}_l$, $\hat{\theta}_m$, and $\hat{\theta}_n$ converge or a predetermined number of iterations occur, proceeding to a next step, otherwise, returning to computing, by a plurality of angle vector processors, angle vectors $\hat{\beta}_0$, $\hat{\beta}_1$, $\hat{\beta}_2$ from the initial estimates of $\hat{\theta}_l$, $\hat{\theta}_m$, $\hat{\theta}_n$; and
converting, by a plurality of decision processors, the re-estimates $\hat{\theta}_l$, $\hat{\theta}_m$, and $\hat{\theta}_n$ into hard estimates $\hat{l}$, $\hat{m}$, and $\hat{n}$.

10. The method of claim 9, wherein the first and second plurality of LPE processors are configured to determine the estimates $\hat{\theta}_l$, $\hat{\theta}_m$, and $\hat{\theta}_n$ as follows:

$$\hat{\theta}_l = \angle(\Sigma_{i=0}^{N_2 P-1}\Sigma_{k=0}^{N_1-2} y_{1,i,k}^* y_{1,i,k+1}),$$

$$\hat{\theta}_m = \angle(\Sigma_{i=0}^{N_1 P-1}\Sigma_{k=0}^{N_2-2} y_{2,i,k}^* y_{2,i,k+1}),$$

$$\hat{\theta}_n = \angle(\Sigma_{i=0}^{N_1 N_2-1}\Sigma_{k=0}^{P-2} y_{0,i,k}^* y_{0,i,k+1}),$$

wherein $N_1$, $N_2$, and P are sizes of discrete Fourier transform (DFT) vectors, $y_{j,i,k}$ and $y_{j,i,k+1}$, for j=0, 1, or 2, are consecutive samples of the optimal precoding matrix for H, and "*" indicates complex conjugation.

11. The method of claim 9, wherein the plurality of angle vector processors are configured to determine the angle vectors $\hat{\beta}_0$, $\hat{\beta}_1$, $\hat{\beta}_2$, respectively, as follows:

$$\hat{\beta}_0 = [0 \ldots (N_2-1)\hat{\theta}_m \ldots (N_1-1)\hat{\theta}_l \ldots (N_1-1)\hat{\theta}_l + (N_2-1)\hat{\theta}_m]^T,$$

$$\hat{\beta}_1 = [0,\hat{\theta}_m \ldots (N_2-1)\hat{\theta}_m, \hat{\theta}_n, \hat{\theta}_n + \hat{\theta}_m \ldots \hat{\theta}_n + (N_2-1)\hat{\theta}_m]^T,$$

$$\hat{\beta}_2 = [0,\hat{\theta}_l \ldots (N_1-1)\hat{\theta}_l, \hat{\theta}_n, \hat{\theta}_n + \hat{\theta}_l \ldots \hat{\theta}_n + (N_1-1)\hat{\theta}_l]^T,$$

wherein $N_1$ and $N_2$ are sizes of DFT vectors, and T is a transpose function, wherein the plurality of MRC processors are configured to generate the combined vectors $\bar{y}_0$, $\bar{y}_1$, and $\bar{y}_2$, respectively, as follows:

$$\bar{y}_1 = \frac{1}{N_2 P}\sum_{i=0}^{N_2 P-1} y_{1,i}^c e^{-j\beta_{1,i}}$$

$$\bar{y}_2 = \frac{1}{N_1 P}\sum_{i=0}^{N_1 P-1} y_{2,i}^c e^{-j\beta_{2,i}}$$

$$\bar{y}_0 = \frac{1}{N_1 N_2}\sum_{i=0}^{N_1 N_2-1} y_{0,i}^c e^{-j\beta_{0,i}}$$

wherein $N_1$, $N_2$, and P are sizes of DFT vectors, and $y_0$, $y_1$, and $y_2$ are subvectors of samples of the optimal precoding matrix for H, and wherein the plurality of decision processors are configured to determine hard estimates of l, m, and n as follows:

$$\hat{l} = \text{round}\left(\frac{O_1 N_1}{2\pi}\hat{\theta}_l\right)\text{mod}(O_1 N_1),$$

$$\hat{m} = \text{round}\left(\frac{O_2 N_2}{2\pi}\hat{\theta}_m\right)\text{mod}(O_2 N_2),$$

$$\hat{n} = \text{round}\left(\frac{2}{\pi}\hat{\theta}_n\right)\text{mod} 4,$$

wherein round is a function for rounding to a nearest integer, $O_1$ and $O_2$ are oversampling factors, and $N_1$ and $N_2$ are sizes of DFT vectors.

12. An apparatus, comprising:
a singular value decomposition (SVD) processor configured to receive a channel matrix H and output samples y of an optimal precoding matrix for H;
a first plurality of linear phase estimation (LPE) processors connected to the SVD processor and configured to determine phase estimates $\hat{\theta}_l$ and $\hat{\theta}_n$ of an angle $\theta_l$ of a horizontal discrete Fourier transform (DFT) index l and a co-phasing $\theta_n$ of cross-polarized antennas of a co-phasing index n, respectively, where l and n are integers;
a plurality of angle vector processors connected to the first plurality of LPE processors and one of a second plurality of LPE processors, respectively, and configured to determine angle vectors $\hat{\beta}_0$, $\hat{\beta}_1$, $\hat{\beta}_2$ computed from the phase estimates $\hat{\theta}_l$ and $\hat{\theta}_n$, and a maximal ratio combining (MRC) based estimate of $\hat{\theta}_m$;
a plurality of MRC processors connected to the SVD processor and to the plurality of angle vector processors, respectively, and configured to generate combined vectors $\bar{y}_0$, $\bar{y}_1$, and $\bar{y}_2$, respectively;
the second plurality of LPE processors connected to the plurality of MRC processors, respectively, and configured to re-estimate $\hat{\theta}_l$, $\hat{\theta}_m$, and $\hat{\theta}_n$, respectively; and
a plurality of decision processors connected to the second plurality of LPE processors, respectively, and each configured to determine a hard estimate of l, m, and n, respectively.

13. The apparatus of claim 12, wherein the SVD processor and the plurality of MRC processors are further configured to perform operations for each individual subcarrier; each of the first plurality of LPE processors, the second plurality of LPE processors, the plurality of angle vector processors, and the plurality of decision processors is configured to perform one of a wideband operation and a sideband operation.

14. The apparatus of claim 12, wherein the SVD processor includes a second column rotation processor.

15. The apparatus of claim 14, further comprising:
an LPE processor connected to the SVD processor and configured to determine a phase estimate $\theta_{l'}$ of an angle $\theta_{l'}$ of a horizontal DFT index l';

a second plurality of angle vector processors connected to the LPE processor and one of a third plurality of LPE processors, respectively, and configured to determine angle vectors $\hat{\beta}'_0$, $\hat{\beta}'_1$, $\hat{\beta}'_2$ computed from the phase estimates and $\hat{\theta}_{l'}$ and $\hat{\theta}_{n'}$, an MRC-based estimate of $\hat{\theta}_{m'}$;

a second plurality of MRC processors connected to the second plurality of angle vector processors and the SVD and second column rotation processor, respectively, and configured to generate combined vectors $\overline{y}'_0$, $\overline{y}'_1$, and $\overline{y}'_2$, respectively;

the third plurality of LPE processors connected to the second plurality of MRC processors, respectively, and configured to re-estimate $\hat{\theta}_{l'}$, $\hat{\theta}_{m'}$, and $\hat{\theta}_{n'}$, respectively; and a second plurality of decision processors connected to the third plurality of LPE processors, respectively, and each configured to determine a hard estimate of l', m', and n', respectively.

16. An apparatus, comprising:
a singular value decomposition (SVD) processor configured to receive a channel matrix H and output samples y of an optimal precoding matrix for H;
a first plurality of linear phase estimation (LPE) processors connected to the SVD processor and configured to determine phase estimates $\hat{\theta}_l$ and $\hat{\theta}_n$ of an angle $\theta_l$ of a horizontal discrete Fourier transform (DFT) index l and a co-phasing $\theta_n$ of cross-polarized antennas of a co-phasing index n, respectively, where l and n are integers;
a plurality of angle vector processors connected to the first plurality of LPE processors and two of a second plurality of LPE processors, respectively, and configured to determine angle vectors $\hat{\beta}_0$, $\hat{\beta}_1$, $\hat{\beta}_2$ computed from the phase estimate of $\hat{\theta}_n$, a maximal ratio combining (MRC) based estimate of $\hat{\theta}_m$, and an MRC-based estimate of $\hat{\theta}_l$;
a plurality of MRC processors connected to the SVD processor and to the plurality of angle vector processors, respectively, and configured to generate combined vectors $\overline{y}_0$, $\overline{y}_1$, and $\overline{y}_2$, respectively;
the second plurality of LPE processors connected to the plurality of MRC processors, respectively, and configured to re-estimate $\hat{\theta}_l$, $\hat{\theta}_m$, and $\hat{\theta}_n$, respectively; and
a plurality of decision processors connected to the second plurality of LPE processors, respectively, and each configured to determine a hard estimate of l, m, and n, respectively.

17. The apparatus of claim 16, wherein the SVD processor and the plurality of MRC processors are further configured to perform operations for each individual subcarrier; each of the first plurality of LPE processors, the second plurality of LPE processors, the plurality of angle vector processors, and the plurality of decision processors is configured to perform one of a wideband operation and a sideband operation.

18. The apparatus of claim 16, wherein the SVD processor is comprised of an SVD and second column rotation processor and further comprising:

an LPE processor connected to the SVD and second column rotation processor and configured to determine a phase estimate $\hat{\theta}_{l'}$ of an angle $\theta_{l'}$ of a horizontal DFT index l';
a second plurality of angle vector processors connected to the LPE processor, one of the first plurality of LPE processor, and one of a third plurality of LPE processors, respectively, and configured to determine angle vectors $\hat{\beta}'_0$, $\hat{\beta}'_1$, $\hat{\beta}'_2$ computed from the phase estimates $\hat{\theta}_{l'}$ and $\hat{\theta}_{n'}$, and an MRC-based estimate of $\hat{\theta}_{m'}$;
a second plurality of MRC processors connected to the second plurality of angle vector processors and the SVD and second column rotation processor, respectively, and configured to generate combined vectors $\overline{y}'_1$, and $\overline{y}'_2$, respectively;
a fourth plurality of LPE processors connected to the second plurality of MRC processors and one of the plurality of angle vector processors, respectively, and configured to re-estimate $\hat{\theta}_{l'}$, $\hat{\theta}_{m'}$, and $\hat{\theta}_{n'}$, respectively; and
a second plurality of decision processors connected to the fourth plurality of LPE processors, respectively, and each configured to determine a hard estimate of l', m', and n', respectively.

19. A method of manufacturing an apparatus, comprising:
forming the apparatus on a wafer or a package with at least one other apparatus, wherein the apparatus comprises a singular value decomposition (SVD) processor, a linear phase estimation (LPE) processor, and a decision processor; and
testing the apparatus, wherein testing the apparatus comprises testing the apparatus using one or more electrical to optical converters, one or more optical splitters that split an optical signal into two or more optical signals, and one or more optical to electrical converters.

20. A method of constructing an integrated circuit, comprising:
generating a mask layout for a set of features for a layer of the integrated circuit, wherein the mask layout includes standard cell library macros for one or more circuit features that include an apparatus comprises a singular value decomposition (SVD) processor, a linear phase estimation (LPE) processor, and a decision processor;
disregarding relative positions of the macros for compliance to layout design rules during the generation of the mask layout;
checking the relative positions of the macros for compliance to layout design rules after generating the mask layout;
upon detection of noncompliance with the layout design rules by any of the macros, modifying the mask layout by modifying each of the noncompliant macros to comply with the layout design rules;
generating a mask according to the modified mask layout with the set of features for the layer of the integrated circuit; and
manufacturing the integrated circuit layer according to the mask.

* * * * *